US012581212B2

(12) United States Patent
Li et al.

(10) Patent No.: US 12,581,212 B2
(45) Date of Patent: Mar. 17, 2026

(54) EVENT SENSOR AND METHOD FOR PRODUCING A SIGNAL STREAM OF EVENT DATA

(71) Applicant: INIVATION AG, Zürich (CH)

(72) Inventors: Chenghan Li, Zürich (CH); Arnaud Defernez, Azmoos (CH)

(73) Assignee: INIVATION AG, Zurich (CH)

( * ) Notice: Subject to any disclaimer, the term of this patent is extended or adjusted under 35 U.S.C. 154(b) by 218 days.

(21) Appl. No.: 18/551,818

(22) PCT Filed: Mar. 22, 2022

(86) PCT No.: PCT/EP2022/057500
§ 371 (c)(1),
(2) Date: Sep. 21, 2023

(87) PCT Pub. No.: WO2022/200354
PCT Pub. Date: Sep. 29, 2022

(65) Prior Publication Data
US 2024/0163575 A1      May 16, 2024

(30) Foreign Application Priority Data

Mar. 22, 2021    (EP) ..................................... 21163883

(51) Int. Cl.
*H04N 25/47*          (2023.01)
*H04N 25/587*          (2023.01)
(Continued)

(52) U.S. Cl.
CPC ........... *H04N 25/47* (2023.01); *H04N 25/587* (2023.01); *H04N 25/772* (2023.01); *H04N 25/78* (2023.01); *H04N 25/616* (2023.01)

(58) Field of Classification Search
CPC .... H04N 25/47; H04N 25/587; H04N 25/772; H04N 25/78
See application file for complete search history.

(56) References Cited

U.S. PATENT DOCUMENTS

| | | | |
|---|---|---|---|
| 2013/0162874 A1 | 6/2013 | Hashimoto et al. | |
| 2015/0077590 A1 | 3/2015 | Kuriyama et al. | |
| 2022/0239851 A1* | 7/2022 | Brändli | ................ H04N 25/707 |

FOREIGN PATENT DOCUMENTS

| | | |
|---|---|---|
| EP | 1 814 315 A1 | 8/2007 |
| EP | 2 846 538 A1 | 3/2015 |

(Continued)

OTHER PUBLICATIONS

Amhaz, Hawraa, et al., "Smart Readout Technique Designed for Logarithmic CMOS Image Sensor Including a Motion Detection Scheme," *New Circuits and Systems Conference* (*NEWSCAS*), *2011 IEEE 9th Internaitonal*, pp. 49-52 (Jun. 26, 2011).

*Primary Examiner* — Daniel M Pasiewicz
(74) *Attorney, Agent, or Firm* — Christensen, Fonder, Dardi & Herbert PLLC; John P. Fonder

(57)          ABSTRACT

An event sensor and a method for producing a signal stream of event data in reaction to light incident on a pixel array. The event sensor includes: for each pixel of the array, a photodetector configured to produce a detector signal in reaction to light incident on the pixel; for each pixel or a group of the pixels a signal converter connected to the photodetector and configured to repeatedly produce and store digital sample values dependent on the detector signal sampled at sampling intervals; and a readout processor connected to the signal converter. The readout processor is configured: to derive a digital accumulated pixel value based on the sample values, wherein the accumulated pixel value corresponds to an accumulation of the detector signal over a sampling count of the sampling intervals; and to generate a pixel event of the event data dependent on the accumulated pixel value and sampling count.

17 Claims, 7 Drawing Sheets

(51) Int. Cl.
    *H04N 25/616*      (2023.01)
    *H04N 25/772*      (2023.01)
    *H04N 25/78*      (2023.01)

(56)             References Cited

FOREIGN PATENT DOCUMENTS

| | | |
|---|---|---|
| JP | 2012-080252 A | 4/2012 |
| JP | 2016-082484 A | 5/2016 |
| JP | 2018-186576 A | 11/2018 |
| WO | WO 2020/229981 A1 | 11/2020 |

* cited by examiner

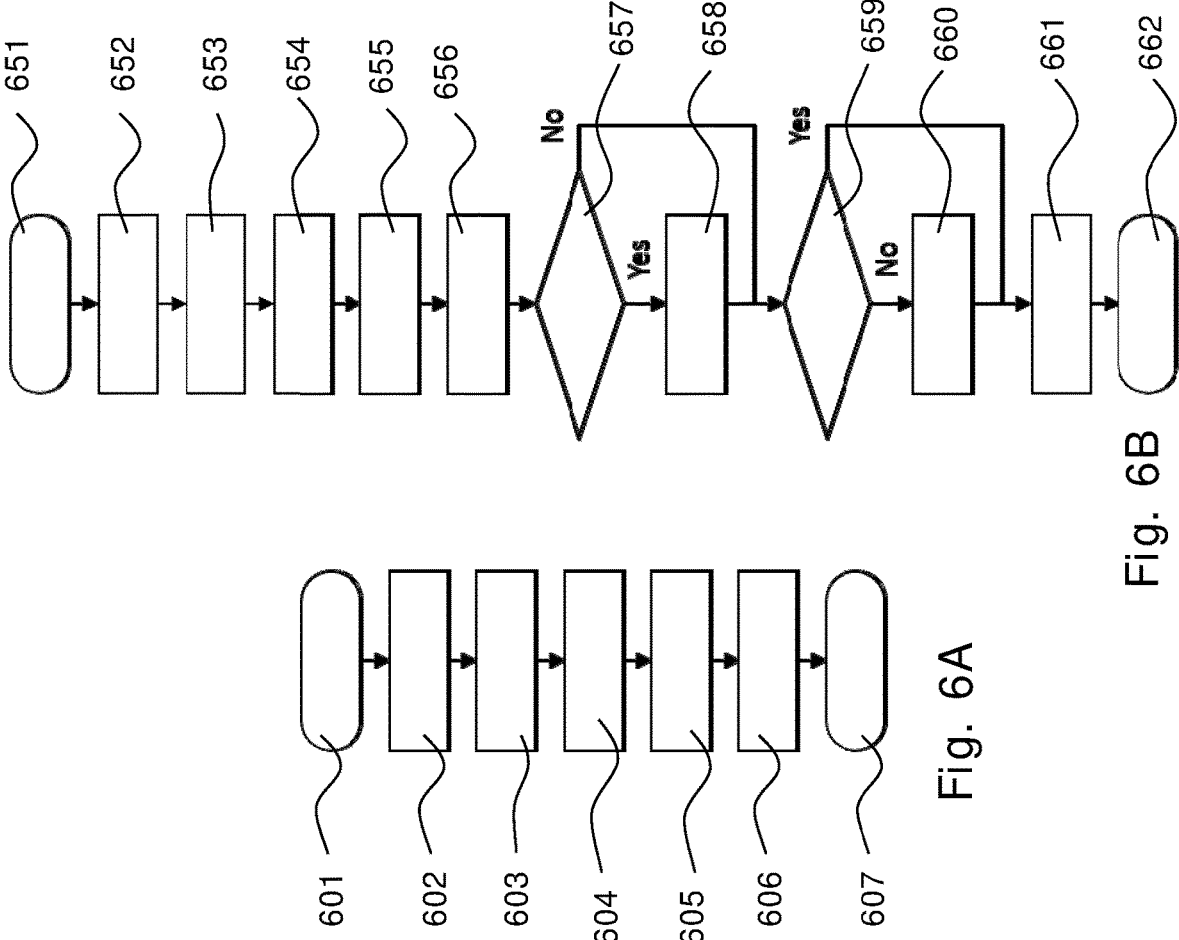
Fig. 6B
Fig. 6A
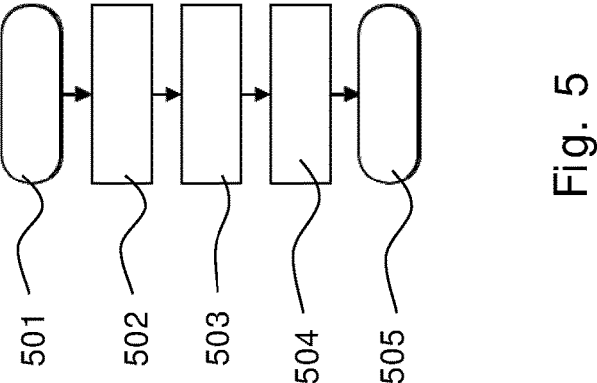
Fig. 5

1201
1202
1203
1204
1205
1206
1207
1208
1209
1210
1211

1101
1102
1103
1104

EVENT SENSOR AND METHOD FOR PRODUCING A SIGNAL STREAM OF EVENT DATA

RELATED APPLICATIONS

The present application is a National Phase entry of PCT Application No. PCT/EP2022/057500, filed Mar. 22, 2022, which claims priority to European Patent Application No. 21163883.8, filed Mar. 22, 2021, the disclosures of which are hereby incorporated by reference herein in their entirety.

FIELD OF THE INVENTION

The invention relates to an event sensor and a method for producing a signal stream of event data in reaction to light incident on a pixel array.

BACKGROUND OF THE INVENTION

Conventional image sensors record a scene by capturing a sequence of consecutive frames in the form of digital intensity values measured by every pixel at every frame, then transferring all these digital intensity values to a receiving computer for processing. The main drawbacks of this approach include a limited temporal resolution, a high latency and a high data redundancy.

In some machine vision tasks, such as tracking, localization and detection of moving objects, it is desirable for the machine vision algorithm to receive an input with a high temporal resolution and a minimum latency. For such machine vision tasks, it is also undesirable to receive and process a large amount of redundant or irrelevant information. Therefore, such machine vision tasks demand a smart image sensor that has a high temporal resolution, a low latency, and a low data redundancy. This demand is not met by the conventional image sensors.

An unconventional sensor design, which encodes temporal contrast of the scene captured by its photosensors, is proposed in U.S. Pat. No. 7,728,269 B2. By encoding the temporal contrast, temporal redundancy in the output data of the image sensor is almost eliminated, thereby producing activity-driven sparse data in the format of ON/OFF pixel events. This means that each pixel event consists of a sign ON/OFF and pixel coordinates. Such an event-based temporal contrast sensor concept, also known as an event sensor concept, provides a unique combination of advantages not offered by the conventional image sensors: a high dynamic range, a high temporal resolution, a low latency, and a low data redundancy. Hence, the event sensor concept has been adopted in numerous alternative or improved designs and is also the basis of the present invention.

The design proposed in U.S. Pat. No. 7,728,269 B2 utilizes subthreshold MOSFET behavior for a logarithmic current-to-voltage conversion to achieve a high dynamic range. Because the temporal contrast is measured instead of absolute intensity, this design is immune to an inter-pixel offset mismatch in the logarithmic current-to-voltage conversion. However, this design still suffers from an inter-pixel gain mismatch in the logarithmic current-to-voltage conversion as well as a change detection step. Besides, this design uses a storage capacitor to store a past light-intensity-dependent signal, which is prone to various leakages that cause a leakage-induced inaccuracy in the pixel event.

WO2020229981A1 proposes an alternative sensor design based on the event sensor concept that employs an analog-to-digital converter (ADC) for each pixel to produce a digital current pixel value that is logarithmically dependent on an incident light intensity. This current and a previous pixel values are then stored and compared digitally. A pixel difference value between the current and the previous pixel values is calculated by a digital subtraction between the current and the previous pixel values. Then a pixel event is generated based on comparing the pixel difference value with an event threshold. This design eliminates the inter-pixel gain mismatch and the leakage-induced inaccuracy in the pixel event. However, this design has several disadvantages, which will be explained in the following paragraphs.

Firstly, this design does not provide a solution to benefit from a potentially significant thermal noise reduction of a state-of-the-art CMOS active pixel circuit via correlated double sampling (CDS). Also, the proposed reset scheme introduces additional thermal noise. As a result, the current and the previous pixel values contain high thermal noise, which degrades the eventual pixel event quality especially under low light conditions.

Secondly, if the active pixel circuit is paired with a logarithmic analog-to-digital (A/D) conversion to achieve a high dynamic range, the pixel's photodiode needs to have a high full well capacity to utilize the full range of the logarithmic A/D conversion. A higher full well capacity requires a larger photodiode, which constrains how compact the pixel can be, and potentially introduces an issue of incomplete charge transfer. A multiple-exposure technique may be implemented to compensate for a limited full well capacity of the photodiode, but at the cost of resulting in a higher latency and a lower temporal resolution.

Thirdly, in order to achieve a high temporal contrast sensitivity across the dynamic range and a low quantization noise in the pixel event, the current and the previous pixel values need to have a high bit depth, such as higher than 10 bits. To achieve a fast pixel-parallel A/D conversion, the current pixel value needs to be stored in the pixel. Therefore, a high bit depth memory in the pixel for the current pixel value constrains how compact the pixel can be. Also, a higher bit depth of the current or the previous pixel value demands higher ADC performance, which may lead to a higher power consumption and higher pixel complexity.

Lastly, the current or the previous pixel value reflects approximately the number of photons detected by the pixel within a predetermined exposure time. In order to realize a high dynamic range, the pixel events need to be generated reliably both from the pixels with near-saturation current and previous pixel values, which correspond to large numbers of detected photons, and from the pixels with near-zero current and previous pixel values, which correspond to small numbers of detected photons. Due to photon shot noise and other temporal noise, a smaller current or previous pixel value has a lower signal-to-noise ratio (SNR). Hence a near-zero current or previous pixel value has a much lower SNR than that of a near-saturation current or previous pixel value. As a result, according to this design, one can either predetermine a lower event threshold to achieve a higher temporal contrast sensitivity, but at the cost of generating more noise pixel events at the pixels with smaller current and previous pixel values; or predetermine a higher event threshold to reduce the noise pixel events from the pixels with smaller current and previous pixel values, but at the cost of a unnecessarily reduced temporal contrast sensitivity for the pixels with larger current and previous pixel values. Similarly, one can either predetermine a shorter exposure time to achieve a higher temporal resolution, but at the cost of generating more noise pixel events due to reduced current and previous pixel values of all pixels; or predetermine a longer exposure time to increase the current and the previous pixel values of all pixels and hence to reduce the noise pixel events, but at the cost of an unnecessarily reduced temporal resolution for the pixels with larger current and previous pixel values.

SUMMARY

It is an objective of the present invention to suggest an improved event sensor and an accompanying method for producing the event data, with an improved data quality. In particular, the objective is to increase the SNR and hence to increase the effective bit depth of each pixel event making up the event data, while keeping the pixels compact. In addition, the objective is to optimize dynamically for each individual pixel a tradeoff between the SNR and the temporal resolution of the pixel event.

This objective is met according to the present invention by providing the event sensor with the features of claim 1 and the method with the features of claim 16. Further advantageous embodiments of the invention are subjects of the sub-claims.

The invention is based on the idea of accumulation/oversampling and averaging in order to increase the SNR and hence to increase the effective bit depth of the pixel event. For this purpose, a digital accumulated pixel value is derived alongside a sampling count for each pixel. The pixel event is then generated dependent on the accumulated pixel value and the sampling count. In particular, the pixel event may be dependent on a division result of dividing the accumulated pixel value by the sampling count.

According to the invention, the event sensor comprises the pixel array and is configured to produce the signal stream comprising the event data in reaction to light incident on the pixel array.

While the expression "light" in a casual context typically refers to the visible range of the electromagnetic (EM) wavelength, i.e. approximately 380-750 nm, EM radiation in the ultraviolet (UV) and the near infrared (NIR) wavelengths may still cause photoelectric or photovoltaic effect in semiconductors, in particular silicon. The detectable wavelength range of the pixel array may be altered and/or extended, if an exotic material other than silicon is used as the photosensitive material. Therefore, the expression "EM radiation" covers more applicable cases of the invention than "light" in a casual context. However, "light" in a scientific context, and therefor also in the present context, can refer to EM radiation of any wavelength. In an advantageous embodiment, "light" may refer to wavelengths ranging between and including UV and NIR. Therefore, the expressions "light" and "EM radiation" are used interchangeably herein.

In particular, the pixel array may comprise a two-dimensional array of W times H pixels, where W and H are both positive integers, W will be called a width number, referring to the number of the pixels along a first dimension and H will be called a height number, referring to the number of the pixels along a second dimension perpendicular to the first dimension. The pixel array may also be referred to as having W columns of H pixels, H rows of W pixels, and/or W columns and H rows of the pixels.

Each pixel of the pixel array comprises at least one photodetector that produces a detector signal in reaction to light incident on the pixel. The photodetector may be any device that converts incident light, i.e. incident photons, into the detector signal. The detector signal may be any form of signal dependent on the incident light, such as a thermal signal or a biochemical signal.

The detector signal may in particular be an electrical signal, such as in the form of a current, a voltage or an electric charge. In this case, the photodetector may be a called a photoelectric converter. The photodetector may perform a photon-to-electron conversion. The photodetector may be a photodiode, in particular a partially or fully pinned photodiode (PPD). The photodetector may be in particular configured to generate electric charge at a certain rate, where the rate at which the electric charge is generated is the detector signal. Therefore, the detector signal may be linearly dependent on, or proportional to, the intensity of the light impinging on the photodetector. The detector signal may in particular be sampled following an exposure of the photodetector. Because the intensity of the light impinging on the photodetector may vary with time, the detector signal may also vary with time. In other words, the detector signal sampled at one point in time may differ from the detector signal sampled at another point in time. However, the detector signal should not be regarded as being duplicated into multiple such detector signals by being sampled at multiple different points in time. The detector signal from one photodetector is described herein as a single time-varying quality that can be sampled repeatedly over time.

There may be advantages to assign multiple photodetectors to one pixel, such as to support phase detection autofocus. In this case, the photodetectors belonging to one pixel may be sampled separately one at a time or sampled together at the same time. Correspondingly, their detector signals may be sampled separately one at a time or sampled together at the same time and therefore combined. Either way, it may be regarded that, at any time, there may be effectively one single detector signal associated with one pixel.

In one embodiment, for each pixel, a signal converter is connected to the photodetector or the photodetectors of the pixel. In other words, there is a one-to-one correspondence between each pixel and one signal converter.

Alternatively, a group of multiple pixels may share one common signal converter. In other words, multiple photodetectors belonging to multiple pixels may be connected to one single signal converter.

In the abovementioned embodiments comprising the signal converter, the signal converter is configured to repeatedly sample the detector signal at sampling intervals, and to repeatedly produce and store digital sample values dependent on the detector signal sampled at the sampling intervals. In particular, the detector signal may be sampled at regular sampling intervals, for example, at 10 or 100 microseconds intervals, which translates to a sampling rate of 100 or 10 Kilohertz. Within each sampling interval, the photodetector may be exposed for a predetermined exposure time, and then the detector signal maybe sampled. In other words, within each sampling interval, there may be one exposure of the photodetector followed by one sampling of the detector signal. The exposure time may in particular be regular. Each sample value is dependent on, in particular linearly dependent on, or proportional to, the detector signal sampled at the corresponding sampling interval. It should be noted that, at each sampling interval, the signal converter may repeatedly produce and store one or multiple of the sample values, or one or multiple sample value(s), dependent on the detector signal sampled once, i.e. one sampling of the detector signal, at the corresponding sampling interval. The purpose of producing and storing multiple sample values at each sampling interval is to allow averaging of these sample values, and hence to reduce the temporal noise contributed by the signal converter.

The expression "repeatedly" herein means again and again, multiple times in time, and may encompass the following possibilities: Firstly, an action taking place "repeatedly" herein may mean that the action takes place one or multiple time(s) within each sampling interval. For example, the detector signal may be sampled one time within each sampling interval. On the other hand, the signal converter may produce and store one or multiple sample value(s) one at a time, for one or multiple time(s) within each sampling interval. Furthermore, an action taking place "repeatedly" herein may mean that the action takes place one or multiple time(s) within one sampling interval, and for multiple of such sampling intervals in a consecutive fashion or in a nonconsecutive fashion, wherein a consecutive fashion means each of such sampling intervals immediately follows another without interruption, or a nonconsecutive fashion means at least two of such sampling intervals within which the action takes place are separated by one or multiple other sampling interval(s) within which the action does not take place. For example, the signal converter may produce and store one or multiple sample value(s) within each sampling interval for multiple sampling intervals in a consecutive fashion. Alternatively, to save power, the signal converter may produce and store one or multiple sample value(s) within one sampling interval, not produce or store any sample value within one or multiple immediately following sampling interval(s), then produce one or multiple sample value(s) within another sampling interval, and so on. This alternative to save power is explained further below.

The signal converter may comprise at least one analog converter that is configured to produce an analog converter value dependent on the detector signal. Advantageously, the analog converter may be configured to repeatedly sample the detector signal at the sampling intervals, and to repeatedly produce and store the converter values dependent on the detector signal sampled at the sampling intervals. In particular, if the detector signal sampled at each sampling interval is in the form of an electric charge, the analog converter may be configured to produce a voltage as the converter value dependent on the detector signal. A gain or a ratio between the converter value and the detector signal, such as in this case between the voltage and the electric charge, is referred to as a conversion gain of the analog converter. The analog converter may comprise an analog converter memory, such as a capacitive memory, where the converter value may be stored. Each converter value is dependent on, in particular linearly dependent on, or proportional to, the detector signal sampled at the corresponding sampling interval. Advantageously, the analog converter may employ the state-of-the-art CMOS active pixel circuit, where a floating diffusion serves as the converter memory.

The signal converter further comprises an ADC that is configured to repeatedly produce and store the sample values dependent on the converter values, which are in turn dependent on the detector signal sampled at sampling intervals. In other words, repeatedly, the ADC takes the converter value as an input, converts the converter value into the sample value, and stores the sample value. Each sample value is dependent on, in particular linearly dependent on, or proportional to, the corresponding converter value, and hence also the detector signal sampled at the corresponding sampling interval. The ADC comprises a multi-bit digital sample memory, where the sample value is stored. The sample memory may be based on SRAM, DRAM, or any other multi-bit memory technology. Advantageously, the ADC may be a slope/ramp ADC, where the sample value stored in the sample memory may be encoded in Gray code format.

In an alternative or cumulative embodiment, the signal converter may further comprise at least one analog amplifier, which is configured to repeatedly produce amplifier values dependent on the converter values, which are in turn dependent on the detector signal sampled at sampling intervals. In particular, repeatedly, the analog amplifier takes the converter value as an input and amplifies the converter value, by an amplification gain, into the amplifier value. In this embodiment, instead of taking the converter values as inputs, the ADC repeatedly takes the amplifier values as inputs, converts the amplifier values into the sample values, and stores the sample values. Each sample value is dependent on, in particular linearly dependent on, or proportional to, the corresponding amplifier value, the corresponding converter value, and hence also the detector signal sampled at the corresponding sampling interval. Advantageously, the analog amplifier may be a capacitive feedback amplifier.

In yet another alternative or cumulative embodiment, the signal converter may be further configured to employ a programmable gain. The programmable gain may comprise the conversion gain of the analog converter, the amplification gain of the analog amplifier, and/or a digital gain of the ADC. Advantageously, if the analog converter employs the active pixel circuit, the conversion gain is determined by the capacitance of the floating diffusion. The conversion gain is thus adjustable via varying the capacitance of the floating diffusion. Furthermore, if the analog amplifier is a capacitive feedback amplifier, the amplification gain is adjustable via varying the ratio between an input capacitance and a feedback capacitance. Lastly, if the ADC is a slope/ramp ADC, the digital gain is adjustable via varying the gradient of a slope/ramp voltage and/or a speed of counting. The programmable gain may in particular be programmed via, or determined by, a digital gain code, which may be a one-bit or multi-bit code. In other words, the conversion gain, the amplification gain, and/or the digital gain may be programmed via, or determined by, the gain code. The signal converter may further comprise a one-bit or multi-bit digital gain memory, in particular based on SRAM, to store the gain code.

It should be noted that each possible gain code is only associated with, but not necessarily equal to, one possible programmable gain. For example, the programmable gain may comprise only the conversion gain, and the gain code may be only one-bit, where a gain code of 0 is associated with a conversion gain of 1, hence a programmable gain of 1, and a gain code of 1 is associated with a conversion gain of 2, hence a programmable gain of 2. As a second example, the programmable gain may comprise the conversion gain and the amplification gain, and the gain code may be two-bit, where a gain code of 00 is associated with a conversion gain of 1 and an amplification gain of 1, hence a programmable gain of 1; a gain code of 10 is associated with a conversion gain of 2 and an amplification gain of 1, hence a programmable gain of 2; a gain code of 01 is associated with a conversion gain of 1 and an amplification gain of 4, hence a programmable gain of 4; and a gain code of 11 is associated with a conversion gain of 2 and an amplification gain of 4, hence a programmable gain of 8. It should be noted here that the conversion gain, the amplification gain, the digital gain, and/or the programmable gain are/is normalized value(s) with respect to their minimum possible value(s) respectively.

There may be multiple possible connection schemes of the photodetectors and the signal converters for the pixels in the pixel array, which may also be mixed and/or combined in some pixels.

In a first exemplary scheme, for each group of P pixel(s), D photodetector(s) is/are connected to one single signal converter, which in particular comprises C analog converter(s), and one single ADC, where P, D and C are positive integers, D is larger than or equal to P, and P is larger than or equal to C. In other words, for each group of P pixel(s), D photodetector(s) is/are connected to C analog converter(s), which is/are in turn connected to one single ADC. In this scheme, D may be equal to C, which means that each of the D photodetector(s) may be connected to one of the C analog converter(s) respectively. Alternatively, D may be larger than C, which means that at least two of the D photodetectors may be connected to one of the C analog converter(s).

In a second exemplary scheme, for each group of P pixel(s), D photodetector(s) is/are connected to one single signal converter, which in particular comprises C analog converter(s), A analog amplifier(s) and one single ADC, where P, D, C and A are positive integers, D is larger than or equal to P, and P is larger than or equal to both C and A. In other words, for each group of P pixel(s), D photodetector(s) is/are connected to C analog converter(s), which is/are in turn connected to A analog amplifier(s), which is/are eventually connected to one single ADC. In this scheme, D may be equal to C, which means that each of the D photodetector(s) may be connected to one of the C analog converter(s) respectively. Alternatively, D may be larger than C, which means that at least two of the D photodetectors may be connected to one of the C analog converter(s). Furthermore, C may be equal to A, which means that each of the C analog converter(s) may be connected to one of the A analog amplifier(s) respectively. Alternatively, C may be larger than A, which means that at least two of the C analog converters may be connected to one of the A analog amplifier(s). Lastly, C may be smaller than A, which means that at least two of the A analog amplifiers may be connected by one of the C analog converter(s).

In any of the abovementioned connection schemes where multiple pixels share one common signal converter, the features described herein with respect to an effective correspondence among one photodetector, one signal converter and one pixel may still apply where possible, in particular if the common signal converter is shared by multiple pixels in a time-multiplexed fashion.

Furthermore, the event sensor comprises a readout processor, which is configured to perform readout of the pixels in the pixel array and to generate one or multiple pixel event(s). The pixel event(s) then make up the signal stream of the event data produced by the event sensor. For this purpose, the readout processor is connected to the signal converter. The readout processor is configured to derive, for each pixel of the pixel array, the digital accumulated pixel value based on one or multiple of the sample values, wherein the accumulated pixel value corresponds to an accumulation or integration of the detector signal over the sampling count of the sampling intervals. The readout processor is further configured to generate, for the corresponding pixel, the pixel event of the event data dependent on the accumulated pixel value and the sampling count.

The sampling count records the number of sampling intervals, or exposures, that the detector signal is accumulated or integrated over. In other words, the sampling count indicates the number of times the sampling of the detector signal has been performed, or the number of times the detector signal has been sampled, within the accumulation. It should be noted that the sampling count may or may not equal the number of sample values that the accumulated pixel value is actually derived based upon. As mentioned previously, at each sampling interval, the signal converter may produce for each sampling of the detector signal one or multiple of the sample values. Furthermore, while the accumulated pixel value is a corresponding digital representation of the accumulation of the detector signal over the sampling count of the sampling intervals, the accumulation may take place in the analog domain, i.e. before the ADC of the signal converter, in the digital domain, i.e. after the ADC of the signal converter, or in a mixed domain consisting of both the analog and the digital domains, i.e. both before and after the ADC of the signal converter. It should be noted that, although the exposure of the photodetector and/or the sampling of the detector signal within each sampling interval may technically be considered already as a form of accumulation, the accumulation described herein specifically refer to an accumulation that takes place beyond or outside of one sampling interval, unless stated otherwise.

In one possible embodiment, corresponding to an analog domain accumulation, i.e. the accumulation taking place purely in the analog domain, the detector signal may be accumulated or integrated continuously inside the analog converter of the signal converter, in particular in the converter memory, for the sampling count of the sampling intervals. Advantageously, the photodetector may be the PPD that generates electric charge at a certain rate as the detector signal, and the analog converter may be the active pixel circuit, where the floating diffusion serves as the converter memory. In this case, the electric charge may accumulate or integrate on the floating diffusion over multiple sampling intervals.

During the analog domain accumulation, the readout processor may at each sampling interval read one or multiple of the sample values produced by the signal converter, derive an average sample value as an average of the sample value(s) within the sampling interval, and decide whether to utilize the average sample value to derive the accumulated pixel value. One condition for this decision may be whether the readout processor determines that the average sample value suggests an impending saturation of the signal converter. In particular, the impending saturation of the signal converter may be suggested by the average sample value exceeding a predetermined sample value threshold. If no impending saturation is suggested by the average sample value, the readout processor may allow the detector signal to continue accumulating in the converter memory over the next sampling interval, and hence decide not to utilize the average sample value to derive the accumulated pixel value. Once an impending saturation is suggested by the average sample value, the readout processor decides to utilize the average sample value to derive the accumulated pixel value and may also decide to reset the analog converter, in particular the converter memory. In this case, the average sample value that suggests the impending saturation may be taken directly by the readout processor as the accumulated pixel value, because the average sample value is already the result of the analog domain accumulation.

Advantageously, to save power during the analog domain accumulation, if the average sample value within one sampling interval is sufficiently low, such as lower than another predetermined sample value threshold, suggesting the signal converter is still a long way from being saturated, the readout processor may decide to turn off the corresponding ADC, and/or to skip or leave out reading the sample value(s), deriving the average sample value and checking for the impending saturation for one or multiple immediately following sampling interval(s), while allowing the detector signal to continue accumulating in the converter memory in the meantime.

In an alternative or cumulative embodiment, the readout processor may combine in the digital domain, e.g. by summation, multiple of the average sample values, which are already the results of the analog domain accumulation, in order to derive the accumulated pixel value. In this case, the accumulation may be described as a mixed domain accumulation, i.e. the accumulation takes place in the mixed domain, in other words partly in the analog domain and partly in the digital domain.

Finally, in yet another alternative embodiment, the accumulation may be described as a digital domain accumulation, i.e. the accumulation takes place purely in the digital domain, when multiple of the average sample values, each corresponding to only the detector signal generated within one single sampling interval, i.e. not being the result of the analog domain accumulation, are combined in the digital domain, e.g. by summation, to derive the accumulated pixel value. This final alternative embodiment can also be implemented in the presence of the converter memory, if the converter memory is reset after each deriving of the average sample value, i.e. at each sampling interval.

It should be noted that, the accumulation may only manifest itself as taking place in the analog domain, in the digital domain, or in the mixed domain when the sampling count is at least two. When the sampling count is only one, the accumulation spans only one sampling interval, therefore the accumulated pixel value is derived base on only one corresponding average sample value, i.e. the average sample value is taken directly by the readout processor as the accumulated pixel value. Furthermore, whenever the average sample value is mentioned herein, if the signal converter produces only one single sample value at each sampling interval, then the single sample value is taken directly by the readout processor as the average sample value within the corresponding sampling interval.

As mentioned before, the pixel array may be composed of W pixel columns and H pixel rows. Hence, the readout processor may comprise W processing blocks, each of the processing blocks being configured to process one of the W pixel columns, one pixel at a time. In other words, any processing or operation said herein to be performed by the readout processor directly or indirectly based on the sample value, the average sample value, the accumulated pixel value, and/or the sampling count of each pixel, may in fact be performed by the corresponding processing block.

When the readout processor consists of exactly W processing blocks, each processing block may be dedicated to processing the H pixels in one column of the pixel array. In this case, the readout processor consists of one row of W processing blocks. Because all processing blocks can process simultaneously in parallel, the readout processor can process one row of the pixels simultaneously in parallel.

Alternatively, the readout processor may have more than W processing blocks, in particular a W multiplied by an integer number of the processing blocks, for example 2, 3 or more times (M times) of W processing blocks, possibly arranged in M rows of W columns, where M is a positive integer significantly smaller than H. In this alternative case, every M processing blocks may be dedicated to processing one column of H pixels. In other words, each column of H pixels may be divided up into M groups, each group being processed by one processing block of the M processing blocks dedicated to the corresponding column of the pixels. Because all processing blocks can process simultaneously in parallel, the readout processor can process M rows of the pixels simultaneously in parallel.

As yet another alternative, the readout processor may have less than W processing blocks, in particular a W divided by an integer number of the processing blocks, for example W divided by 2, W divided by 3 or W divided by D processing blocks, possibly arranged in one row of W divided by D columns, where D is a positive integer significantly smaller than W. In this alternative case, each processing block may be dedicated to processing D times H pixels in D corresponding columns of the pixel array.

According to a preferred embodiment, the readout processor connected to the signal converter is configured: to calculate, for each pixel of the pixel array, a division result of dividing the accumulated pixel value by the sampling count, and to generate, for the corresponding pixel, the pixel event dependent on the division result. The division result can be regarded as corresponding to an average of the detector signal over the sampling count of the sampling intervals. That the generated pixel event depends on one or multiple parameter(s) and/or value(s) such as the accumulated pixel value and the sampling count or the division result may mean that the pixel event contains at least one output of at least one function that takes one, multiple or all of the parameter(s) and/or value(s) as input variable(s). For example, the pixel event may contain a value that is proportional to the division result. Alternatively or cumulatively, the pixel event may be affected by one, multiple or all of the parameter(s) and/or value(s). For example, the pixel event may contain a value that is linearly dependent on the division result if the accumulated pixel value fulfils a certain condition.

According to a further preferred embodiment, the event sensor further comprises a multi-bit digital parameter memory. The parameter memory is connected to the readout processor and stores, for each pixel of the pixel array, pixel parameters associated with the corresponding pixel. The parameter memory may be physically one memory device in one location, or distributed over multiple memory devices in multiple locations. Although this is a preferred option, the parameter memory does not have to be arranged in an array as is the pixel array. The parameter memory may in particular be based on SRAM technology.

It should be noted that, storing of any parameter or value described herein may encompass not only storing the parameter or value in the original form as the parameter or value is derived or produced, but also the possibility of storing the parameter or value in a different, encoded or decoded form, such as Gray code or an output of a function that takes the parameter or value as an input variable. For example, two parameters may be stored in the form of a sum and a difference of these two parameters. Furthermore, reading of any parameter or value by the readout processor described herein may encompass an automatic conversion or decoding step where needed.

In one possible embodiment, corresponding to the analog domain accumulation of the detector signal, the parameter memory is configured to store, for each pixel of the pixel array, the sampling count. In this embodiment, the readout processor is configured: to read the sample values and/or the sampling count, to update the sampling count, to write the sampling count, and to derive the accumulated pixel value.

The sampling count is updated by incrementing the sampling count, in particular by a constant number such as one, for each sampling interval of the accumulation. It should be noted that the sampling count being updated by increment-ing means the sampling count is a forward count, i.e. the sampling count increases as the number of the sampling intervals increases in the accumulation. If the sampling count is implemented as a backward count, i.e. the sampling count decreases as the number of the sampling intervals increases in the accumulation, then the sampling count would be updated by decrementing. Functionally, imple-menting the sampling count as a backward count can be considered equivalent to implementing the sampling count as a forward count. Therefore, for simplicity, the sampling count described herein is a forward count unless stated otherwise. In particular, the sampling count is only updated within one accumulation. The sampling count may be reset or re-started for a new accumulation.

At each sampling interval within the accumulation, the readout processor may read one or multiple of the sample values from the signal converter, read the sampling count from the parameter memory, update the sampling count accordingly, and then write the sampling count back to the parameter memory. The accumulated pixel value is then derived based on the average sample value, i.e. the average of the sample value(s), within the last sampling interval of the accumulation. Advantageously, as described before for saving power, at one or multiple sampling interval(s) within the accumulation, the readout processor may skip or leave out reading the sample value(s) from the signal converter.

According to an alternative or cumulative embodiment comprising the parameter memory, corresponding to the digital domain or the mixed domain accumulation of the detector signal, the parameter memory is configured to store, for each pixel of the pixel array, the accumulated pixel value and the sampling count. In this embodiment, the readout processor is configured: to read the sample values, the accumulated pixel value and/or the sampling count, to update the accumulated pixel value, to update the sampling count, and to write the accumulated pixel value and/or the sampling count.

As with the previous embodiment corresponding to the analog domain accumulation, the sampling count is updated by incrementing the sampling count, in particular by a constant number such as one, for each sampling interval of the accumulation. However, now the accumulated pixel value is also updated, namely by adding the average sample value, i.e. the average of the sample value(s), within one sampling interval of the accumulation to the accumulated pixel value. It should be noted that the accumulated pixel value being updated by adding the average sample value means that both the accumulated pixel value and the sample value have the same sign, i.e. both are positive or both are negative. If the accumulated pixel value and the sample value are configured to have opposite signs, i.e. one positive and the other negative, then the accumulated pixel value would be updated by subtracting the average sample value. Functionally, it can be considered equivalent whether the accumulated pixel value and the sample value are configured to be both positive, both negative or of opposite signs. Therefore, for simplicity, the accumulated pixel value and the sample value described herein are both positive unless stated otherwise. In particular, both the sampling count and the accumulated pixel value are only updated within one accumulation. Both the sampling count and the accumulated pixel value may be reset or re-started for a new accumula-tion.

At each sampling interval within the accumulation, the readout processor may read one or multiple of the sample values from the signal converter, read the accumulated pixel value and the sampling count from the parameter memory, update the accumulated pixel value and the sampling count accordingly, and then write the accumulated pixel value and the sampling count back to the parameter memory. Advan-tageously, as described before for saving power, at one or multiple sampling interval(s) within the accumulation, the readout processor may skip or leave out reading the sample value(s) from the signal converter, reading the accumulated pixel value from the parameter memory, updating the accu-mulated pixel value, and/or writing the accumulated pixel value back to the parameter memory.

In further embodiments comprising the parameter memory, the parameter memory may alternatively or cumu-latively be configured to store, for each pixel of the pixel array: a previous accumulated pixel value, a previous sam-pling count, and/or a previous division result of dividing the previous accumulated pixel value by the previous sampling count. The previous accumulated pixel value is named as such because it is an identical copy or record of the accu-mulated pixel value derived at a past or a previous accu-mulation. On the other hand, the accumulated pixel value derived at a present or a current accumulation may be referred to herein as a current accumulated pixel value, or simply as the accumulated pixel value. This nomenclature applies similarly herein to the previous sampling count, the previous division result, a current sampling count, a current division result, the sampling count, and/or the division result. In these embodiments, the readout processor is con-figured: to read the previous accumulated pixel value, the previous sampling count, and/or the previous division result, and to generate, for the corresponding pixel, the pixel event based on the division result and the previous division result. Here, the readout processor may be configured: to calculate the division result, to read the previous division result from the parameter memory, and to use the previous division result together with the division result as the basis for generating the pixel event. Alternatively, the readout pro-cessor may be configured: to calculate the division result, to read the previous accumulated pixel value and the previous sampling count, to then calculate the previous division result, and to use the previous division result together with the division result as the basis for generating the pixel event. Upon generating the pixel event, i.e. when the pixel event is generated, the readout processor may be configured to overwrite the previous accumulated pixel value, the previ-ous sampling count, and/or the previous division result stored in the parameter memory with the accumulated pixel value, the sampling count and/or the division result of the corresponding pixel, respectively.

Advantageously, the division result and/or the previous division result (each) contain(s) a higher number of bits, or a higher bit depth than that of the sample values. Because of the herein described accumulation/oversampling and aver-aging technique, the division result and/or the previous division result have/has a higher effective number of bits (ENOB), a higher effective bit depth, or a higher SNR than that of the sample values. The ENOB or the effective bit depth of the division result and/or the previous division result may in particular be higher than the nominal bit resolution of the signal converter, i.e. the ADC in the signal converter. This is in particular advantageous for keeping the pixel compact and low power while reaching a higher ENOB or effective bit depth of the pixel event.

In preferred embodiments, the readout processor is con-figured to determine, for each pixel of the pixel array, an accumulated pixel value threshold based on the sampling count and/or the previous sampling count, and/or to determine, for each pixel of the pixel array, a count threshold based on the accumulated pixel value and/or the previous accumulated pixel value. In other words, either the sampling count and/or the previous sampling count can be used to determine the accumulated pixel value threshold, or the accumulated pixel value and/or the previous accumulated pixel value can be used to determine the count threshold. There is also the option of determining both the accumulated pixel value threshold and the count threshold. The readout processor is further configured: to compare the accumulated pixel value and/or the previous accumulated pixel value with the accumulated pixel value threshold, and/or to compare the sampling count and/or the previous sampling count with the count threshold, and to generate, for the corresponding pixel, the pixel event on the condition that, i.e. based on a necessary condition that, the accumulated pixel value and/or the previous accumulated pixel value exceed(s) the accumulated pixel value threshold, and/or that the sampling count and/or the previous sampling count exceed(s) the count threshold. In other words, the necessary condition that the accumulated pixel value threshold and/or the count threshold are/is exceeded is a necessary condition for generating the pixel event. The necessary condition being fulfilled may also mark the end of one accumulation. It should be noted that the accumulation described herein is to be understood as a process of performing one complete accumulation or integration sequence or cycle.

In advantageous embodiments, the readout processor is configured to determine, in particular for each pixel of the pixel array that fulfils the necessary condition for generating the pixel event, based on the sampling count, the previous sampling count, the accumulated pixel value, and/or the previous accumulated pixel value, the following pixel-specific threshold(s): at least one temporal contrast threshold, at least one spatial contrast threshold, at least one temporal difference threshold, at least one spatial difference threshold, and/or at least one intensity value threshold. It should be noted that these embodiments and the previous embodiments encompass the possibility that, in certain cases, the count threshold, the accumulated pixel value threshold, the temporal contrast threshold(s), the spatial contrast threshold(s), the temporal difference threshold(s), the spatial difference threshold(s), and/or the intensity value threshold(s) can be constant, i.e. independent of the sampling count, the previous sampling count, the accumulated pixel value, and/or the previous accumulated pixel value.

In further preferred embodiments, the readout processor is configured to calculate, in particular for each pixel of the pixel array that fulfils the necessary condition for generating the pixel event, the following pixel-specific value(s): a temporal contrast, at least one spatial contrast, a temporal difference, at least one spatial difference, and/or an intensity value. The readout processor is further configured to generate, for the corresponding pixel, the pixel event based on (a) comparison result(s) of comparing the temporal contrast with the temporal contrast threshold(s), the spatial contrast(s) with the spatial contrast threshold(s), the temporal difference with the temporal difference threshold(s), the spatial difference(s) with the spatial difference threshold(s), and/or the intensity value with the intensity value threshold(s). The comparison result(s) may in particular be that the temporal contrast, the spatial contrast(s), the temporal difference, the spatial difference(s), and/or the intensity value have/has or have/has not crossed their respective threshold(s). In particular, the pixel event may contain a pixel address or pixel coordinate(s), such as consisting of a row address and/or a column address, of the pixel. Advantageously, the pixel event may further contain a value dependent on the temporal contrast, the spatial contrast(s), the temporal difference, the spatial difference(s), and/or the intensity value. For example, the pixel event may contain the pixel address and the temporal contrast scaled by a coefficient.

For each of the temporal contrast, the spatial contrast(s), the temporal difference, the spatial difference(s), and/or the intensity value, there may be one single threshold or at least two thresholds respectively, such as a positive threshold and a negative threshold, or an upper threshold and a lower threshold. There may be in particular a positive temporal contrast threshold and a negative temporal contrast threshold, and the comparison result may be that the temporal contrast has or has not crossed either the positive temporal contrast threshold or the negative temporal contrast threshold. Similarly, there may be a positive spatial contrast threshold and a negative spatial contrast threshold, and the comparison result(s) may be that the spatial contrast(s) has/have or has/have not crossed either the positive spatial contrast threshold or the negative spatial contrast threshold. Furthermore, there may be a positive temporal difference threshold and a negative temporal difference threshold, and the comparison result may be that the temporal difference has or has not crossed either the positive temporal difference threshold or the negative temporal difference threshold. Similarly, there may be a positive spatial difference threshold and a negative spatial difference threshold, and the comparison result(s) may be that the spatial difference(s) has/have or has/have not crossed either the positive spatial difference threshold or the negative spatial difference threshold. Finally, there may be an upper intensity value threshold and a lower intensity value threshold, and the comparison result may be that the intensity value has or has not crossed either the upper intensity value threshold or the lower intensity value threshold.

The temporal contrast may be calculated based on a quotient of the division result and the previous division result. This means in particular that the temporal contrast may be calculated by first calculating the quotient by dividing the division result by the previous division result, or by dividing the previous division result by the division result, and then calculating the temporal contrast as a function, in particular a linear function, of the quotient. Alternatively, the temporal contrast may be calculated in a different fashion and still be dependent on the quotient. Preferably, the temporal contrast is calculated as the division result divided by the previous division result, the result of which may then optionally be subtracted by one. Thus, the temporal contrast reflects a relative change in the incident light intensity received by the corresponding pixel over time, more specifically, a relative difference between a past average incident light intensity over a past accumulation, and a present average incident light intensity over a present accumulation.

The spatial contrast may be calculated based on a second quotient of the division result and a neighboring division result. The neighboring division result corresponds to a neighboring pixel that is located in a neighborhood of the pixel. The neighboring pixel of each pixel may refer to another pixel that lies in the pixel array within a certain distance or radius, such as within 1 or 2 or 3 pixel(s), from the pixel. In other words, the neighboring division result refers to the division result, or possibly the previous division result, corresponding to the neighboring pixel. Therefore, each processing block of the readout processor may be configured to read the neighboring division result from a neighboring processing block that corresponds to the neighboring pixel, and then calculate the spatial contrast. For example, the neighboring pixel of each pixel may be located, immediately or not immediately, to the right side or to the left side of the pixel. In this example, each pixel and the corresponding neighboring pixel are located in the same row of the pixel array. As described in one of the previous embodiments, the readout processor may consist of one row of processing blocks and be configured to process one row of the pixels simultaneously in parallel. In this embodiment, the neighboring processing block of each processing block may also be located, immediately or not immediately, to the right side or to the left side of the processing block. As a second example, the neighboring pixel of each pixel may be located, immediately or not immediately, directly or indirectly, above or below the pixel. In this second example, each pixel and the corresponding neighboring pixel are located in different rows of the pixel array. Advantageously, as described in another of the previous embodiments, the readout processor may consist of M rows of processing blocks and be configured to process M rows of the pixels simultaneously in parallel, where M is a positive integer. In this embodiment, the neighboring processing block of each processing block may then be located, immediately or not immediately, directly or indirectly, above or below the processing block.

The spatial contrast may in particular be calculated by first calculating the second quotient by dividing the division result by the neighboring division result, or by dividing the neighboring division result by the division result, and then calculating the spatial contrast as a function, in particular a linear function, of the second quotient. Alternatively, the spatial contrast may be calculated in a different fashion and still be dependent on the second quotient. Preferably, the spatial contrast is calculated as the division result divided by the neighboring division result, the result of which may then optionally be subtracted by one. Thus, the spatial contrast reflects a relative change in the incident light intensity over space, from the neighboring pixel to the pixel, more specifically, a relative difference between an average incident light intensity over the accumulation received by the neighboring pixel, and an average incident light intensity over the accumulation received by the pixel.

Advantageously, each pixel may have multiple corresponding neighboring pixels. Therefore, each processing block may be configured to read multiple neighboring division results from multiple neighboring processing blocks respectively, and then calculate multiple spatial contrasts respectively. For example, each pixel may have a first neighboring pixel located to the left or to the right of the pixel, and a second neighboring pixel above or below the pixel. In this example, each processing block may be configured to calculate two spatial contrasts, a first spatial contrast between the pixel and the first neighboring pixel, and a second spatial contrast between the pixel and the second neighboring pixel. Both the first and the second spatial contrasts are calculated in the same way as described previously.

The temporal difference may be calculated based on a difference between the division result and the previous division result. This means in particular that the temporal difference may be calculated by first calculating the difference by subtracting the previous division result from the division result, or by subtracting the division result from the previous division result, and then calculating the temporal difference as a function, in particular a linear function, of the difference. Alternatively, the temporal difference may be calculated in a different fashion and still be dependent on the difference. Preferably, the temporal difference is calculated as the division result subtracted by the previous division result. It should be noted that the difference may possibly be the absolute value of a subtraction result of subtracting the division result by the previous division result. Thus, the temporal difference reflects a change in the incident light intensity received by the corresponding pixel over time, more specifically, a difference between a past average incident light intensity over a past accumulation, and a present average incident light intensity over a present accumulation.

The spatial difference may be calculated based on a second difference between the division result and the neighboring division result. This means in particular that the spatial difference may be calculated by first calculating the second difference by subtracting the neighboring division result from the division result, or by subtracting the division result from the neighboring division result, and then calculating the spatial difference as a function, in particular a linear function, of the second difference. Alternatively, the spatial difference may be calculated in a different fashion and still be dependent on the second difference. Preferably, the spatial difference is calculated as the division result subtracted by the neighboring division result. It should be noted that the second difference may possibly be the absolute value of a subtraction result of subtracting the division result by the neighboring division result. Thus, the spatial difference reflects a change in the incident light intensity over space, from the neighboring pixel to the pixel, more specifically, a difference between an average incident light intensity over the accumulation received by the neighboring pixel, and an average incident light intensity over the accumulation received by the pixel.

Advantageously, as described previously, each pixel may have multiple corresponding neighboring pixels. Therefore, each processing block may be configured to read multiple neighboring division results from multiple neighboring processing blocks respectively, and then calculate multiple spatial differences respectively.

The intensity value may be calculated based on the division result and/or the previous division result. The intensity value may in particular be calculated as a function, in particular a linear function, of the division result and/or the previous division result. The intensity value may in particular be identical or proportional to the division result or the previous division result. Preferably, the intensity value is calculated as being identical or equal to the division result or the previous division result. Thus, the intensity value reflects the incident light intensity received by the corresponding pixel, more specifically, an average incident light intensity over the accumulation.

In further embodiments where the signal converter employs the programmable gain, the readout processor may be further configured to program or re-program the programmable gain via writing or updating the gain code stored in the corresponding gain memory based on a comparison result of comparing the intensity value of the corresponding pixel with the intensity value threshold(s). In particular, the readout processor may increase the programmable gain, via updating the gain code, if the intensity value falls below one of the intensity value threshold(s), and/or decrease the programmable gain, via updating the gain code, if the intensity value exceeds the same one or another of the intensity value threshold(s). Main objectives of this configuration are: to improve the SNR of the pixel event especially when the incident light intensity is low; and to extend the dynamic range of the signal converter and hence the pixel event when the incident light intensity is high. Alternatively, the readout processor may be configured to program or re-program the programmable gain via writing or updating the gain code stored in the corresponding gain memory based on a comparison result of comparing the sample value and/or the average sample value with one or multiple sample value threshold(s) in a similar fashion as described in the previous configurations. This alternative configuration achieves the same objective as the previous configurations. Furthermore, this alternative configuration allows updating the gain code, thus re-programming the programmable gain, during each accumulation.

According to an advantageous embodiment, the event sensor may further comprise a multi-bit digital threshold memory connected to the readout processor. The threshold memory may be configured to store a lookup table. Advantageously, the content of the lookup table may be precomputed or generated via calibration, prestored in the threshold memory before the readout of the pixel array, and updated during the readout of the pixel array.

The lookup table may contain one or multiple row(s) or tuple(s) of two or more processing thresholds associated with each other, wherein the processing thresholds in each tuple are: the count threshold, the accumulated pixel value threshold, the temporal contrast threshold(s), the spatial contrast threshold(s), the temporal difference threshold(s), the spatial difference threshold(s), and/or the intensity value threshold(s). In other words, the lookup table may be filled with the tuple(s) containing these processing thresholds. Here the tuple(s) of the processing thresholds describes the organization of the content of the lookup table, not necessarily the physical layout of the threshold memory. The readout processor is then configured to select one, multiple or all of the processing thresholds from one of the tuple(s) as output(s) of the lookup table based on input(s) to the lookup table. In particular, the input(s) to the lookup table may be the sampling count, the previous sampling count, the accumulated pixel value and/or the previous accumulated pixel value of the corresponding pixel. The readout processor may be configured: to compare the input(s) to the lookup table with respective processing threshold(s) in the tuple(s), to find one adjacent tuple, and to select one, multiple or all of the processing thresholds, in particular one, multiple or all of the other processing threshold(s) apart from the respective processing threshold(s), in the adjacent tuple as the output(s) of the lookup table. In particular, in each tuple, the respective processing threshold to be compared with the sampling count and/or the previous sampling count may be the count threshold, and/or the respective processing threshold to be compared with the accumulated pixel value and/or the previous accumulated pixel value may be the accumulated pixel value threshold.

In particular, the readout processor may compare the input(s) to the lookup table with the respective processing threshold(s) in the tuple(s), and find the adjacent tuple in which the respective processing threshold(s) is/are adjacent to, i.e. immediately above, immediately below, or the closest to, the input(s) to the lookup table. For example, the input to the lookup table may be the sampling count. The readout processor may find the adjacent tuple, in which the count threshold is immediately above the sampling count. In this example, the readout processor may then select two of the other processing thresholds in the adjacent tuple, e.g. the accumulated pixel value threshold and the temporal contrast threshold as the outputs of the lookup table. It should be noted that the expression(s) of being "adjacent to", being "immediately above", being "immediately below", and/or being "the closest to" described herein may encompass the possibility of being equal to.

Alternatively or cumulatively, the lookup table may contain two or more rows or tuples of the processing thresholds associated with each other, wherein the readout processor may be configured: to find two or more adjacent and/or close tuples, and to interpolate and/or extrapolate the output(s) of the lookup table based on the adjacent and/or close tuples.

In particular, the readout processor may compare the input(s) to the lookup table with the respective processing threshold(s) in the tuples, and find the adjacent and/or close tuples in which the respective processing threshold(s) is/are adjacent and/or close to, i.e. immediately above, immediately below, the closest to, closely but not immediately above and/or closely but not immediately below, the input(s) to the lookup table. For example, the input to the lookup table may be the sampling count, wherein the readout processor may find two adjacent and/or close tuples, in one of which the count threshold is immediately below the sampling count, and in the other of which the count threshold is immediately above the sampling count. In this example, the readout processor may then interpolate the accumulated pixel value threshold and the temporal contrast threshold as the outputs of the lookup table based on the accumulated pixel value thresholds and the temporal contrast thresholds in the two adjacent and/or close tuples. As an alternative example, where the input to the lookup table may still be the sampling count, the readout processor may find two adjacent and/or close tuples, in one of which the count threshold is immediately below the sampling count, and in the other of which the count threshold is closely but not immediately below the sampling count. In this alternative example, the readout processor may then extrapolate the accumulated pixel value threshold and the temporal contrast threshold as the outputs of the lookup table based on the accumulated pixel value thresholds and the temporal contrast thresholds in the two adjacent and/or close tuples.

Thus, the readout processor is configured to select or determine the count threshold, the accumulated pixel value threshold, the temporal contrast threshold(s), the spatial contrast threshold(s), the temporal difference threshold(s), the spatial difference threshold(s), and/or the intensity value threshold(s) via the following possible way(s): by comparing the sampling count, the previous sampling count, the accumulated pixel value and/or the previous accumulated pixel value of the corresponding pixel with the respective processing threshold(s) in the lookup table to find the adjacent tuple, and then selecting the count threshold, the accumulated pixel value threshold, the temporal contrast threshold(s), the spatial contrast threshold(s), the temporal difference threshold(s), the spatial difference threshold(s), and/or the intensity value threshold(s) from the adjacent tuple; and/or by comparing the sampling count, the previous sampling count, the accumulated pixel value and/or the previous accumulated pixel value of the corresponding pixel with the respective processing threshold(s) in the lookup table to find the two or more adjacent and/or close tuples, and then interpolating or extrapolating the count threshold, the accumulated pixel value threshold, the temporal contrast threshold(s), the spatial contrast threshold(s), the temporal difference threshold(s), the spatial difference threshold(s), and/or the intensity value threshold(s) based on the two or more adjacent and/or close tuples.

In embodiments where the lookup table contains two or more tuples, preferably, for any pair of the tuples in the lookup table: the tuple with the lower count threshold contains the higher accumulated pixel value threshold, the smaller absolute value(s) of the temporal contrast threshold(s), the smaller absolute value(s) of the spatial contrast threshold(s), the larger absolute value(s) of the temporal difference threshold(s), and/or the larger absolute value(s) of the spatial difference threshold(s); and the tuple with the higher count threshold contains the lower accumulated pixel value threshold, the larger absolute value(s) of the temporal contrast threshold(s), the larger absolute value(s) of the spatial contrast threshold(s), the smaller absolute value(s) of the temporal difference threshold(s), and/or the smaller absolute value(s) of the spatial difference threshold(s). Therefore, if for example the input to the lookup table is the sampling count, and the outputs of the lookup table are the accumulated pixel value threshold and the temporal contrast threshold(s), the accumulated pixel value threshold selected or determined by the readout processor lowers as the sampling count increases, with the objective of finding the optimal tradeoff between the SNR and the temporal resolution. Similarly, the absolute value(s) of the temporal contrast threshold(s) increases as the sampling count increases to prevent generating noise pixel event.

Alternatively or cumulatively, the threshold memory may be configured to store one or multiple coefficient(s) or parameter(s) for one or multiple threshold function(s) that map(s) one or multiple input(s) of the threshold function(s) to one or multiple output(s) of the threshold function(s). The input(s) of the threshold function(s) is/are: the sampling count, the previous sampling count, the accumulated pixel value or/and the previous accumulated pixel value. The output(s) of the threshold function(s) is/are: the count threshold, the accumulated pixel value threshold, the temporal contrast threshold(s), the spatial contrast threshold(s), the temporal difference threshold(s), the spatial difference threshold(s), or/and the intensity value threshold(s). In this case, the readout processor may be configured to derive the count threshold, the accumulated pixel value threshold, the temporal contrast threshold(s), the spatial contrast threshold(s), the temporal difference threshold(s), the spatial difference threshold(s), and/or the intensity value threshold(s) from the sampling count, the previous sampling count, the accumulated pixel value and/or the previous accumulated pixel value using the threshold function(s).

In further advantageous embodiments comprising the abovementioned threshold function(s), the temporal contrast threshold(s) include(s) a positive temporal contrast threshold, a negative temporal contrast threshold, and/or an absolute temporal contrast threshold; the spatial contrast threshold(s) include(s) a positive spatial contrast threshold, a negative spatial contrast threshold, and/or an absolute spatial contrast threshold; the temporal difference threshold(s) include(s) a positive temporal difference threshold, a negative temporal difference threshold, and/or an absolute temporal difference threshold; and/or the spatial difference threshold(s) include(s) a positive spatial difference threshold, a negative spatial difference threshold, and/or an absolute spatial difference threshold. In this case, the threshold function(s) may satisfy the following characteristic(s): the threshold function(s) mapping the sampling count and/or the previous sampling count to the accumulated pixel value threshold is/are monotonically decreasing; the threshold function(s) mapping the accumulated pixel value and/or the previous accumulated pixel value to the count threshold is/are monotonically decreasing; the threshold function(s) mapping the sampling count and/or the previous sampling count to the positive temporal contrast threshold, the absolute temporal contrast threshold, the positive spatial contrast threshold, and/or the absolute spatial contrast threshold is/are monotonically increasing; the threshold function(s) mapping the sampling count and/or the previous sampling count to the negative temporal contrast threshold and/or the negative spatial contrast threshold is/are monotonically decreasing; the threshold function(s) mapping the accumulated pixel value and/or the previous accumulated pixel value to the positive temporal contrast threshold, the absolute temporal contrast threshold, the positive spatial contrast threshold, and/or the absolute spatial contrast threshold is/are monotonically decreasing; the threshold function(s) mapping the accumulated pixel value and/or the previous accumulated pixel value to the negative temporal contrast threshold and/or the negative spatial contrast threshold is/are monotonically increasing; the threshold function(s) mapping the sampling count and/or the previous sampling count to the positive temporal difference threshold, the absolute temporal difference threshold, the positive spatial difference threshold, and/or the absolute spatial difference threshold is/are monotonically decreasing; the threshold function(s) mapping the sampling count and/or the previous sampling count to the negative temporal difference threshold and/or the negative spatial difference threshold is/are monotonically increasing; the threshold function(s) mapping the accumulated pixel value and/or the previous accumulated pixel value to the positive temporal difference threshold, the absolute temporal difference threshold, the positive spatial difference threshold, and/or the absolute spatial difference threshold is/are monotonically increasing; and/or the threshold function(s) mapping the accumulated pixel value and/or the previous accumulated pixel value to the negative temporal difference threshold and/or the negative spatial difference threshold is/are monotonically decreasing. Advantageously, the expression(s) "monotonically increasing" and/or "monotonically decreasing" described herein may in particular refer to strictly increasing and/or strictly decreasing respectively.

Because of the abovementioned characteristic(s) of the lookup table and/or the threshold function(s), the accumulated pixel value and/or the previous accumulated pixel value at the end of the respective accumulation(s) may (approximately) increase as the average incident light intensity of the corresponding pixel over the respective accumulation(s) increases; on the other hand, the sampling count and/or the previous sampling count at the end of the respective accumulation(s) may (approximately) decrease as the average incident light intensity of the corresponding pixel over the respective accumulation(s) increases. In other words, the accumulated pixel value, the previous accumulated pixel value, the sampling count, and/or the previous sampling count may (approximately) reflect, linearly or nonlinearly, the average incident light intensity of the corresponding pixel over the respective accumulation(s). Here, the expressions "(approximately) increase", "(approximately) decrease" and "(approximately) reflect" may mean respectively: either monotonically increase, monotonically decrease, and hence accurately indicate; or follow a line or a curve of best fit that monotonically increases, follow a line or a curve of best fit that monotonically decreases, and hence approximately indicate. Therefore, in the embodiments described herein that involves the division result, the previous division result and/or the neighboring division result, any usage of the division result, the previous division result, and/or the neighboring division result may alternatively be replaced where possible, by appropriate usage of the accumulated pixel value, the previous accumulated pixel value, the sampling count, and/or the previous sampling count of the pixel and/or of the neighboring pixel at the end of the respective accumulation(s). For example, the intensity value may be alternatively calculated, or approximated, as a constant number subtracted by the sampling count at the end of the accumulation. Here the constant number may be in particular the maximum possible value of the sampling count. Furthermore, if such calculation results in that the intensity value reflects approximately logarithmically the average incident light intensity over the accumulation, then the temporal contrast may be alternatively approximated based on a difference between the sampling count and the previous sampling count, similarly, the spatial contrast may be alternatively approximated based on a difference between the sampling count(s) and/or the previous sampling count(s) corresponding to the pixel and the neighboring pixel respectively.

Advantageously, the parameter memory is configured to further store, for each pixel or a group of the pixels of the pixel array, a processing option parameter. In this embodiment, the readout processor may be configured to generate the pixel event according to the processing option parameter of the corresponding pixel. In particular, determined by the processing option parameter, the readout processor may be configured to perform one processing option selected from two or more processing options. The two or more processing options may in particular include one processing option called event detection, which refers to the aforementioned processing/operations performed by the readout processor for generating the pixel event, in particular dependent on the temporal contrast threshold(s), the spatial contrast threshold(s), the temporal difference threshold(s), the spatial difference threshold(s), and/or the intensity value threshold(s) of the corresponding pixel.

The two or more processing options may in particular include another processing option called frame capture, which refers to a modified subset of the aforementioned processing/operations performed by the readout processor for calculating and outputting the intensity value, in particular modified in such a way that the intensity value is calculated and outputted independent of the temporal contrast threshold(s), the spatial contrast threshold(s), the temporal difference threshold(s), the spatial difference threshold(s), and/or the intensity value threshold(s). The outputted intensity values from the pixels designated for frame capture may be collectively called frame data. Therefore, the processing option parameter may determine whether event detection is performed or whether frame capture is pursued by the readout processor for the corresponding pixel.

Furthermore, the parameter memory is configured such that the processing option parameters may be preconfigured and prestored before the readout of the pixel array, and updated during the readout of the pixel array. In other words, at a first sampling interval, a first subset of the pixels in the pixel array may be designated for a first processing option, while a second subset of the pixels in the pixel array may be designated for a second processing option, and so on; at a second sampling interval, the first subset of the pixels in the pixel array may be designated for the second processing option, while the second subset of the pixels in the pixel array may be designated for the first processing option, and so on. Here, it is possible to have more than two subsets of the pixels in the pixel array, and to have more than two processing options determined by the processing option parameter.

Advantageously, the readout processor is configured: to compensate for a baseline or an offset in the sample values by subtracting a sample baseline or an offset compensator from the accumulated pixel value and/or the previous accumulated pixel value, wherein the sample baseline is produced by the signal converter, or the offset compensator is stored, for each pixel of the pixel array, in the parameter memory; and/or to normalize the sample value, the average sample value, the accumulated pixel value and/or the previous accumulated pixel value by multiplying the sample value, the average sample value, the accumulated pixel value and/or the previous accumulated pixel value by a normalization factor, wherein the normalization factor is derived by the readout processor based on a gain mismatch corrector and/or the gain code, i.e. the programmable gain associated with the gain code, and wherein the gain mismatch corrector is stored, for each pixel of the pixel array, in the parameter memory.

The sample baseline may be produced by the signal converter following a reset of the analog converter, in particular the converter memory, and without sampling the detector signal. In other words, the readout processor may be configured to read the sample baseline from the corresponding pixel following the reset of the analog converter. Advantageously, if the analog converter employs the active pixel circuit, the sample baseline reflects a combination of the offset and the thermal noise introduced by the reset of the converter memory. Therefore, the sample baseline supports the use of CDS to reduce both the offset and the thermal noise in the sample values. Furthermore, just like the way the signal converter may produce multiple sample values in one sampling interval to allow deriving the average sample value, the signal converter may also produce multiple sample baselines following one reset of the analog converter to allow deriving an average sample baseline, which may be used in place of the sample baseline. The purpose of deriving and using the average sample baseline is to reduce the temporal noise contributed by the signal converter. Alternatively, the offset compensator for each pixel of the pixel array may be derived via calibration and prestored in the parameter memory. In other words, the readout processor may be configured to read the corresponding offset compensator from the parameter memory. The offset compensator supports reduction of the offset but not reduction of the thermal noise in the sample values.

The normalization factor may be dependent on the gain mismatch corrector. The gain mismatch corrector aims to compensate for the inter-pixel gain mismatch in the sample values introduced by fabrication process variations, such as variation in the conversion gain from one pixel to another. The gain mismatch corrector for each pixel of the pixel array may be derived via calibration and prestored in the parameter memory. In other words, the readout processor may be configured to read the corresponding gain mismatch corrector from the parameter memory, and then derive the normalization factor based on the gain mismatch corrector. The normalization factor may be dependent on, in particular linearly dependent on or proportional to, the gain mismatch corrector. Preferably, the normalization factor may be identical or equal to the gain mismatch corrector.

In advantageous embodiments where the signal converter employs the programmable gain, the normalization factor may be dependent on the gain mismatch corrector and/or the programmable gain associated with the gain code of the corresponding pixel. In other words, the readout processor may be configured to read the corresponding gain mismatch corrector from the parameter memory, read the gain code from the gain memory of the corresponding pixel, and then derive the normalization factor based on the gain mismatch corrector and/or the gain code. As described before, the normalization factor may be dependent on, in particular linearly dependent on or proportional to, the gain mismatch corrector. On the other hand, the normalization factor may be dependent on, in particular inversely proportional to, the programmable gain associated with the gain code of the corresponding pixel. Preferably, the normalization factor may be dependent on, in particular linearly dependent on or proportional to, the corresponding gain mismatch corrector divided by the programmable gain associated with the gain code of the corresponding pixel. It should be noted that for each pixel, different gain codes may correspond to different gain mismatch correctors. Therefore, advantageously, the parameter memory may store, for each pixel of the pixel array that employs the programmable gain, one or multiple gain mismatch corrector(s). The readout processor is then configured to select the corresponding gain mismatch corrector according to the gain code of the corresponding pixel in order to derive the normalization factor.

Furthermore, if within each accumulation, the sample value(s) is/are produced using the same gain code, then the readout processor may be configured to normalize the accumulated pixel value and/or the previous accumulated pixel value by multiplying the accumulated pixel value and/or the previous accumulated pixel value by the corresponding normalization factor. However, if within each accumulation, the sample values are produced using different gain codes, then the readout processor may be configured to normalize the sample values and/or the average sample values by multiplying the sample values and/or the average sample values by the respective normalization factors, before deriving the accumulated pixel value and/or the previous accumulated pixel value.

Advantageously, the readout processor is configured to normalize the accumulated pixel value and/or the previous accumulated pixel value before the accumulated pixel value and/or the previous accumulated pixel value are/is compared to the accumulated pixel value threshold and/or divided by the sampling count and/or the previous sampling count (respectively). In embodiments where the previous accumulated pixel value is stored in the parameter memory, the previous accumulated pixel value is preferably normalized before being stored in the parameter memory. Lastly, in embodiments implementing the analog domain accumulation, the readout processor may be configured to normalize the sample value and/or the average sample value before comparing the sample value and/or the average sample value with the sample value threshold(s).

According to one preferred embodiment, the readout processor is configured such that the processing options comprise one called calibration, wherein the accumulated pixel value, the previous accumulated pixel value, the division result and/or the previous division result may be outputted by the readout processor. During a calibration process, which is preformed when one pixel, a subset of the pixels or all pixels in the pixel array is/are designated for calibration, one or multiple of the pixel parameters of the corresponding pixel or pixels may be derived and/or adjusted for optimal performance of the event sensor. In particular, the offset compensator and/or the gain mismatch corrector for each pixel of the pixel array may be derived and/or adjusted during the calibration process. During the calibration process, the pixel array or a region of the pixel array may be exposed to one or multiple known uniform illumination level(s), and the accumulated pixel value, the previous accumulated pixel value, the division result and/or the previous division result may then be sent by the readout processor to an external device, and utilized by the external device to derive and/or adjust the various pixel parameters, in particular the offset compensator and/or the gain mismatch corrector, for each pixel. Furthermore, the external device may measure the temporal noise in, or the SNR of, the accumulated pixel value, the previous accumulated pixel value, the division result and/or the previous division result, and then based on the measured temporal noise or SNR, precompute or generate one, multiple or all of the processing thresholds in the lookup table and/or one, multiple or all of the coefficient(s) or parameter(s) for the threshold function(s). While the external device may not be part of the event sensor as described herein, it may well be part of a device/system that the event sensor is built into, and/or may even be placed on the same integrated circuit chip and/or in the same package as the event sensor.

According to an advantageous embodiment, an array of the photodetectors and a corresponding array of the signal converters together make up a joint physical region or volume, which can be defined as the pixel array. In other words, the pixel array can be defined as comprising the array of the photodetectors and the array of the signal converters. On the other hand, the readout processor, the parameter memory and/or the threshold memory may be placed in other regions or volumes outside of the pixel array. Herein, the expression "region" refers to a two-dimensional area, in particular on a two-dimensional or planar integrated circuit chip, and the expression "volume" refers to a three-dimensional space, in particular in a three-dimensional or stacked integrated circuit chip.

It is possible to fabricate the event sensor on a single semiconductor die, such that the pixel array, the readout processor, the parameter memory, and the threshold memory are all physically placed on the same die. However, it may be more advantageous to fabricate this event sensor using a structure of two stacked dies, with part of the pixel array fabricated on a sensor die, and with the rest of the pixel array, the readout processor, the parameter memory and the threshold memory fabricated on a logic die, wherein the sensor die is stacked and bonded on top of the logic die. Here, the part of the pixel array on the sensor die may in particular comprise the array of the photodetectors and part of the array of the signal converters, such as an array of the analog converters; and the rest of the pixel array on the logic die may in particular comprise the rest of the array of the signal converters, such as an array of the ADCs, and possibly an array of the analog amplifiers. Furthermore, it may be even more advantageous to utilize a structure of three stacked dies, such as: the first die carries the array of the photodetectors and the array of the analog converters; the second die carries the array of the ADCs, possibly the array of the analog amplifiers, and the readout processor; and the third die carries the parameter memory and the threshold memory.

According to a further aspect of the invention, a method for producing a signal stream of event data in reaction to light incident on a pixel array (10) of pixels is provided. The method comprises the following steps performed for each pixel or a group of the pixels:

producing a detector signal in reaction to light incident on the pixel;

repeatedly producing and storing digital sample values dependent on the detector signal sampled at sampling intervals;

deriving a digital accumulated pixel value based on one or multiple of the sample values, wherein the accumulated pixel value corresponds to an accumulation of the detector signal over a sampling count of the sampling intervals; and generating a pixel event of the event data dependent on the accumulated pixel value and the sampling count.

Any features and advantages described herein in connection with the event sensor may also apply analogously to the method.

BRIEF DESCRIPTION OF THE DRAWINGS

Some examples of embodiments of the present invention will be explained in more detail in the following description with reference to the accompanying schematic drawings, wherein:

FIG. 5 shows a flow chart of processing steps performed by a readout processor for processing a sample baseline according to a preferred embodiment;

FIG. 6A, 6B show flow charts of processing steps performed by the readout processor for processing a sample value according to two preferred embodiments;

DETAILED DESCRIPTION

Figures 1A, 1B, 1C:
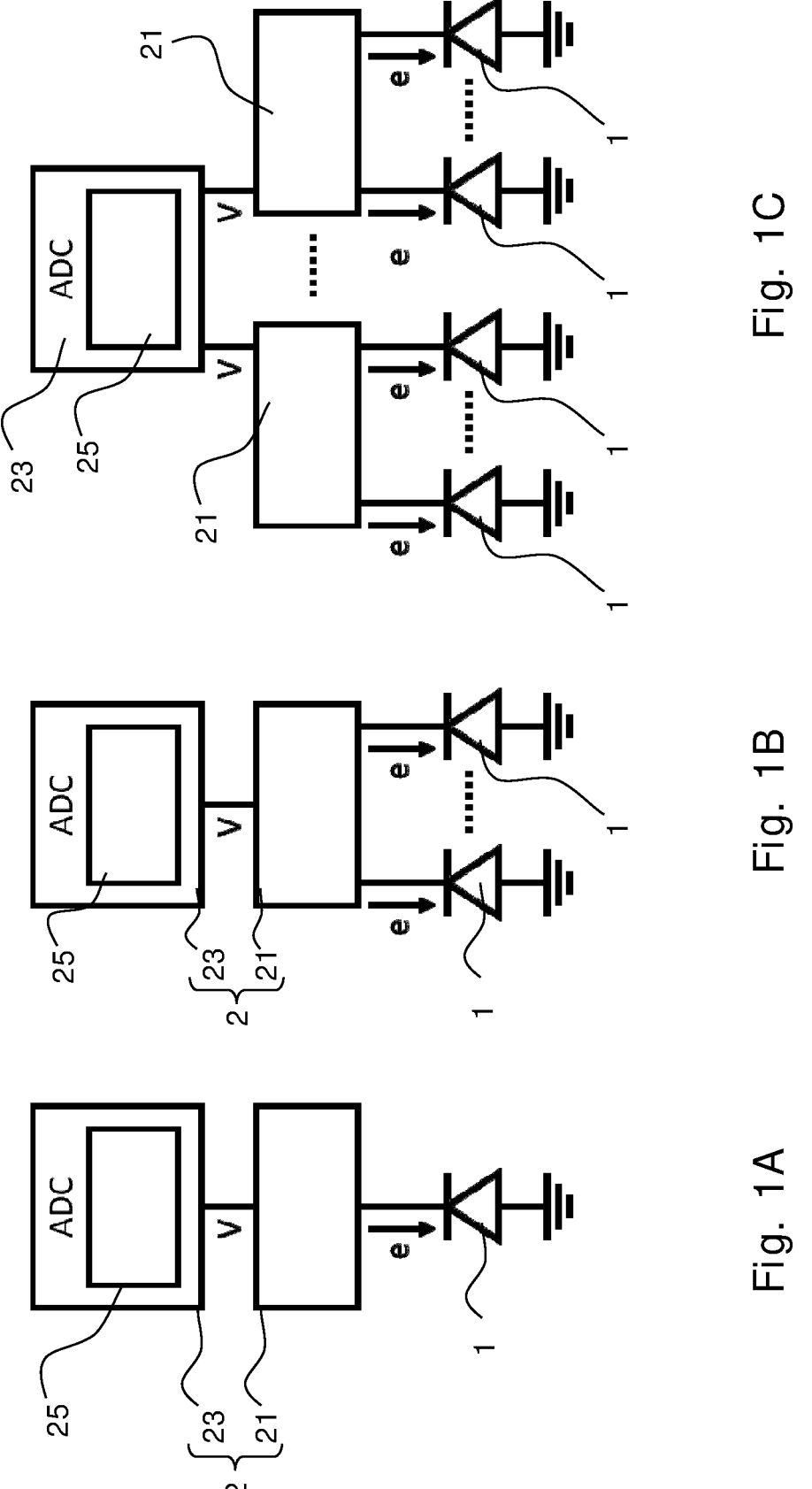
FIG. 1A, 1B, 1C show block diagrams of one pixel or a group of pixels according three different embodiments.

FIGS. 1A, 1B, and 1C each shows a block diagram of different embodiments of connecting a photodetector 1 and a signal converter 2 for pixels in a pixel array. In these three embodiments, each pixel of the pixel array comprises exactly one photodetector 1, namely a photodiode 1, which converts photons to electrons. Other advantageous embodiments may foresee that multiple photodetectors are associated with one single pixel. The photodiode 1 is connected to the signal converter 2, which comprises an analog converter 21, here a charge-to-voltage converter or electron-to-voltage (e/V) converter 21, and an analog-to-digital converter (ADC) 23. Other advantageous embodiments may foresee that the signal converter further implements a programmable gain and/or comprises an analog amplifier.

According to one possible embodiment shown in FIG. 1A, besides the photodiode 1, each pixel comprises one pixel-specific e/V converter 21 and one pixel-specific ADC 23 with a sample memory 25. According to another possible embodiment shown in FIG. 1B, a group of pixels, such as 2 or 2×2 pixels, share one common e/V converter 21 and one common ADC 23. In this embodiment, the e/V converter 21 may contain switching elements to selectively connect one or multiple of the photodiodes 1 in the group of the pixels to the e/V converter 21 via time-multiplexing. According to yet another possible embodiment shown in FIG. 1C, a smaller group of pixels, such as 2 or 2×2 pixels, may share one common e/V converter 21, and a larger group of the pixels, such as 4 or 4×4 pixels, which contains the smaller group of the pixels, may share one common ADC 23. In other words, within the larger group of the pixels, a group of the e/V converters 21, such as 2 or 2×2 e/V converters 21, may share one common ADC 23. Here, the e/V converter 21 and/or the ADC 23 may contain switching elements to selectively connect one or multiple of the photodiodes 1 in the smaller group of the pixels to the e/V converter 21, and/or one of the e/V converters 21 in the larger group of the pixels to the ADC 23 via time-multiplexing.

Figures 2, 3:
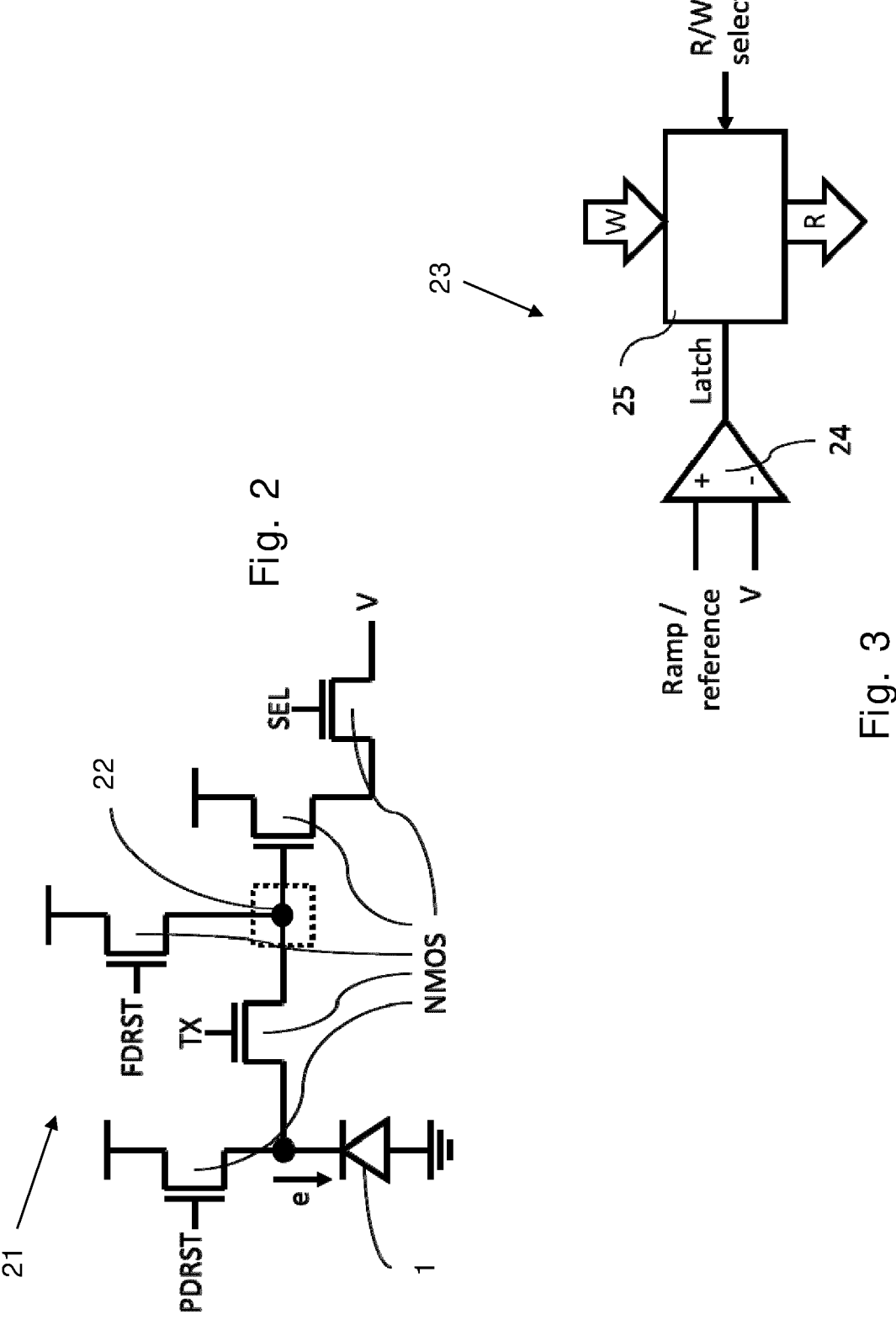
FIG. 2 shows a circuit diagram of a specific embodiment of an analog converter connected to a photodetector.
FIG. 3 shows a block diagram of a specific embodiment of an analog-to-digital converter (ADC)

There are several ways to implement the pixel design. As an advantageous example, a 5-transistor (5T) active pixel circuit 21 shown in FIG. 2, is employed as the e/V converter 21. Here, switching PDRST from high to low initiates an exposure of the photodetector 1, which in this case may in particular be a pinned photodiode (PPD) 1; switching TX from low to high initiates a charge transfer from the PPD 1 to a floating diffusion 22, which serves as a converter memory 22; switching TX from high to low completes the charge transfer and hence also the exposure, which can be regarded as the completion of one sampling of a detector signal generated by the PPD; the floating diffusion 22 can be reset by switching PDRST to high; lastly, switching SEL to high allows an e/V converter output V to be read, typically via a source follower circuit (not fully shown in FIG. 2). Thus, the active pixel circuit 21 performs a linear e/V conversion and allows reduction of the offset and the thermal noise at the e/V conversion step via correlated double sampling (CDS). Advantageously, the active pixel circuit 21 is paired with a linearly coded ADC 23 to support SNR improvement at a later digital processing step. Such a combination of the active pixel circuit 21 and the linearly coded ADC 23 supports producing a sample value that is proportional to the incident light intensity received by the photodiode 1. Alternatively, other types of the e/V converter 21 and the ADC 23 can be paired to support producing the sample value that is proportional to the incident light intensity received by the photodiode 1.

FIG. 3 shows one advantageous example of a linearly coded ADC 23. Here a single-slope ADC design is adopted by the ADC 23 due to its simplicity. The ADC 23 receives a peripherally generated global ramp/reference voltage and a global bit pattern from a peripheral counter through a shared digital bus. During an A/D conversion, the ramp/reference voltage starts to sweep from a starting voltage level to an end voltage level. At the same time, the counter starts counting. The counter counts linearly, so an underlying value encoded by the bit pattern increases linearly with time. When the ramp/reference voltage crosses the voltage level of the e/V converter output V, a comparator 24 generates a latch signal to store a current bit pattern into the sample memory 25. To avoid storing a spurious bit pattern when the latch signal is generated during the transition of two successive counts, the bit pattern is preferably in Gray code format. The stored bit pattern encodes the sample value and is stored in the sample memory 25 for readout. The sample memory 25 can be based on SRAM, DRAM, or any other multi-bit memory circuit.

Figure 4:
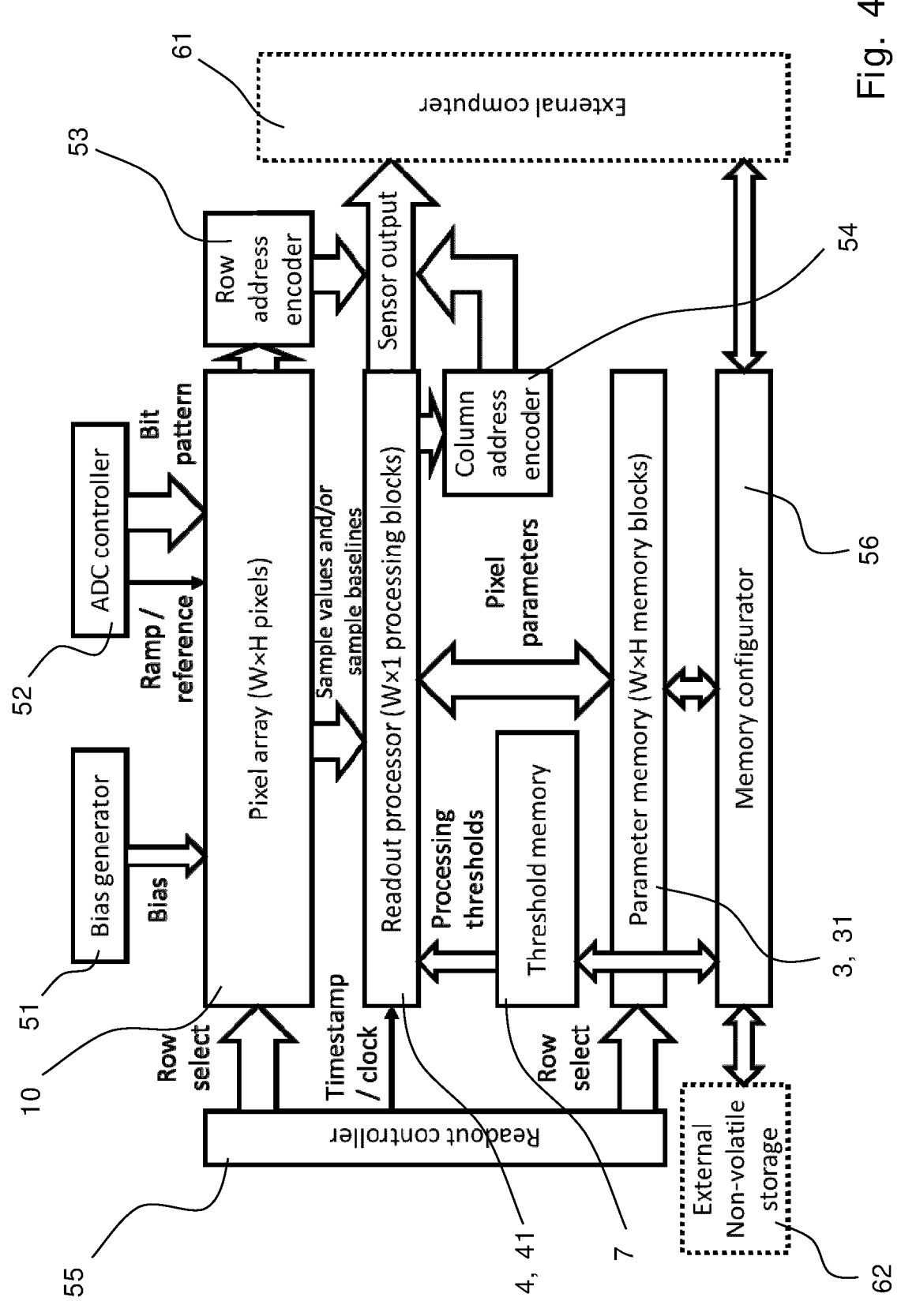
FIG. 4 shows a block diagram of an entire event sensor according to a preferred embodiment.

FIG. 4 shows the event sensor architecture according to one advantageous embodiment. The event sensor contains a two-dimensional pixel array 10 of W columns by H rows of the pixels. The pixels may be configured as any of the embodiments shown in FIG. 1A, 1B, or 1C, or any combination thereof. A bias generator 51 provides bias voltages to the pixel array 10. An ADC controller 52 provides the ramp/reference voltage and the bit pattern in Gray code format to the pixel array 10. A row address encoder 53 and a column address encoder 54 encode the pixel address in the pixel array 10.

Advantageously, each pixel comprises one pixel-specific ADC 23. Therefore, a readout processor 4 consists of W columns by one row of processing blocks 41. Each processing block 41 is configured to process one column of the pixels in the pixel array 10, one pixel at a time. All processing blocks 41 can process simultaneously in parallel, so the readout processor 4 can process one row of the pixels simultaneously in parallel at a time. The readout processor 4 reads the sample values and/or sample baselines from the pixel array 10 and reads/writes pixel parameters from/to a parameter memory 3. The parameter memory 3 is advantageously SRAM-based and contains an array of W columns by H rows of memory blocks 31. In other words, there is a one-to-one correspondence between the pixels in the pixel array 10 and the memory blocks 31 of the parameter memory 3. The read and write operations between the pixel array 10, the readout processor 4 and the parameter memory 3 are coordinated by a readout controller 55. The readout processor 4 is connected with a threshold memory 7, which stores a lookup table. The parameter memory 3 and the threshold memory 7 can be loaded from an external non-volatile storage 62, such as a flash memory, and/or programmed or updated by an external computer 61 via a memory configurator 56.

As previously described, advantageous alternatives may include a group of pixels sharing one common ADC 23, or sharing one common e/V converter 21 and/or one common ADC 23. For example, each group of 2×2 pixels in a pixel array 10 may share one common ADC 23, or may share one common e/V converter 21 and one common ADC 23. In this example, the pixel array 10 of W columns by H rows of the pixels only contains W/2 columns by H/2 rows of the ADCs 23. Therefore, a readout processor 4 may only contain W/2 columns by one row of processing blocks 41. On the other hand, a parameter memory 3 may still contain W columns by H rows of memory blocks 31, maintaining the one-to-one correspondence between the pixels and the memory blocks 31.

Each memory block 31 of the parameter memory 3 stores the pixel parameters of the corresponding pixel, which may include: a processing option parameter, an accumulated pixel value, a previous accumulated pixel value, a sampling count, a previous sampling count, a gain mismatch corrector and an offset compensator. For more clarity, the accumulated pixel value and the sampling count may be referred to hereafter as the current accumulated pixel value and the current sampling count.

The processing option parameter is pixel-specific. This means that each pixel is associated with one corresponding processing option parameter, which determines how the processing block 41 processes that pixel. Each pixel may allow multiple processing options, for example: event detection, frame capture, standby, and calibration. The gain mismatch corrector and the offset compensator are also pixel-specific to allow correction or compensation of the inter-pixel gain mismatch and the offset. The gain mismatch corrector and the offset compensator can be obtained through a one-time calibration procedure. The current accumulated pixel value, the previous accumulated pixel value, the current sampling count, and the previous sampling count support the oversampling and averaging technique. When assuming that each memory block 31 of the parameter memory 3 requires 60 bits to store all of these herein mentioned pixel parameters, the silicon area of the entire parameter memory 3 serving a 1 Megapixel pixel array 10 requires an area of less than 8 mm² if using a state-of-the-art 28 nm SRAM technology.

The lookup table in the threshold memory 7 contains various processing thresholds, which may include: at least one count threshold, at least one accumulated pixel value threshold, at least one temporal contrast threshold, at least one spatial contrast threshold, at least one temporal difference threshold, at least one spatial difference threshold, and/or at least one intensity value threshold. Their values can also be determined based on the one-time calibration procedure. The lookup table guides the processing blocks to dynamically select different processing threshold(s) when processing different pixels at different times.

Correlated Double Sampling (CDS)

Advantageously, each pixel consists of one photodiode 1, one e/V converter 21 and one ADC 23. The event sensor performs a global synchronous fixed-duration exposure of the pixels at regular and/or fixed sampling intervals. The number of times each pixel is exposed per second is referred to as the sampling rate.

To reduce the offset and the thermal noise at the e/V conversion step via CDS, the ADC 23 may produce the sample baseline alongside the sample value at each sampling interval. The sample baseline and the sample value are then read and processed by the corresponding processing block 41 of the readout processor 4 to derive the current accumulated pixel value and/or the previous accumulated pixel value.

The event sensor first performs a global synchronous reset of the e/V converter 21, i.e. the converter memory 22, and converts the corresponding e/V converter output V into the sample baseline via the ADC 23 in a pixel-parallel fashion. Then, the processing blocks 41 read the sample baselines from the pixel array 10 row by row. Simultaneously, when each row of the pixel array 10 is being read, the processing blocks 41 also read the current accumulated pixel values of the corresponding row from the parameter memory 3. In other words, coordinated by the readout controller 55, the sample baselines and the current accumulated pixel values of the same row are received by all processing blocks 41 at the same time.

Each processing block 41 then performs for each pixel the following processing steps, shown in a flow chart in FIG. 5:

1. Receive the sample baseline and the current accumulated pixel value of the same pixel (501);
2. Convert the sample baseline from Gray code into binary format (502);
3. Update the current accumulated pixel value by subtracting the sample baseline from the current accumulated pixel value (503);
4. Write the current accumulated pixel value back into the corresponding memory block (504); and
5. End of processing (505).

By subtracting the sample baseline, the offset and the thermal noise introduced by resetting the e/V converter 21, i.e. the converter memory 22, are minimized in the current accumulated pixel value.

Advantageously, the processing block 41 may decide to discard the sample baseline, such as when the current sampling count exceeds a certain count threshold, and instead to subtract the prestored offset compensator from the current accumulated pixel value. Doing so still reduces the offset, but retains the thermal noise, which is a white noise, in the sample value, and hence facilitates the oversampling and averaging technique better, especially when the pixel receives a low incident light intensity. This technique may be considered as dithering.

The event sensor then performs a global synchronous charge transfer of the e/V converter 21 and converts the corresponding e/V converter output V into the sample value via the ADC 23 in a pixel-parallel fashion.

Then, the processing blocks 41 read the sample values, the current accumulated pixel values, the current sampling counts, the processing option parameters, and possibly other relevant pixel parameters (which may vary depending on the processing options of the pixels) corresponding to the same row in a row-by-row fashion, coordinated by the readout controller 55. Each processing block 41 then performs for each pixel the following processing steps, shown in a flow chart in FIG. 6A:

1. Receive the sample value, the current accumulated pixel value, the current sampling count, the processing option parameter [and possibly other relevant pixel parameters determined by the processing option parameter] of the same pixel (601);
2. Convert the sample value from Gray code into binary format (602);
3. Update the current accumulated pixel value by adding the sample value to the current accumulated pixel value (603);
4. Update the current sampling count by incrementing the current sampling count by one (604);
5. [Further processing steps determined by the processing option parameter] (605);
6. Write the current accumulated pixel value, the current sampling count [and possibly other relevant pixel parameters determined by the processing option parameter] back into the corresponding memory block (606); and
7. End of processing (607).

In step 605 of the above processing steps, the processing block 41 may perform different further processing steps according to the processing option of the pixel. Some possible processing options and their corresponding further processing steps to be performed are described further below.

As an advantageous alternative, if the signal converter 2 has a sufficient saturation capacity, there may be for each pixel only one sample baseline every few sampling intervals, taking advantage of the thermal-noise-free charge transfer offered by the active pixel circuit 21. In other words, for each pixel, in some sampling intervals, there may be only the sample value, and without the sample baseline. In this case, the sample value in the corresponding sampling interval may contain the sample value in the immediately preceding sampling interval. Therefore, the processing block 41 may need to perform for each pixel the following alternative processing steps to update the current accumulated pixel value differently, as well as to flag the pixel for resetting the active pixel circuit 21, in particular the floating diffusion 22, and for producing the sample baseline in the next sampling interval based on a condition that the sample value exceeds a predetermined sample value threshold. As shown in the flow chart in FIG. 6B, the alternative processing steps are:

1. Receive the sample value, the current accumulated pixel value, the current sampling count, the processing option parameter [and possibly other relevant pixel parameters determined by the processing option parameter] of the same pixel (651);

2. Convert the sample value from Gray code into binary format (652);
3. Update the current accumulated pixel value by adding the sample value to the current accumulated pixel value (653);
4. Update the current sampling count by incrementing the current sampling count by one (654);
5. [Further processing steps determined by the processing option parameter: in any of the further processing steps, resetting the accumulated pixel value to zero entails setting a pixel reset flag to "true" to reset the e/V converter 21 and to produce a sample baseline in the next sampling interval] (655);
6. [Optional] Compute a normalized sample value by multiplying the sample value with a normalization factor, which in this case consists of only the gain mismatch corrector (656);
7. Decide if the sample value or the normalized sample value exceeds the sample value threshold (657):
   a. If yes:
      i. Set the pixel reset flag to "true" to reset the e/V converter 21 and to produce the sample baseline in the next sampling interval (658);
   b. If no: no action
8. Decide if the pixel reset flag is "true" (659):
   a. If yes: no action
   b. If no:
      i. Undo updating the current accumulated pixel value by subtracting the sample value from the current accumulated pixel value (660);
9. Write the current accumulated pixel value, the current sampling count [and possibly other relevant pixel parameters determined by the processing option parameter] back into the corresponding memory block (661); and
10. End of processing (662).

In the above processing steps, the sample value threshold may be stored in the threshold memory 7. The pixel reset flag may be stored in a flag memory inside the pixel. The pixel reset flag may also be set to "true" if in one of the further processing steps the accumulated pixel value is reset to zero (which is described further below). Therefore, in some special cases of implementations where the pixel reset flag is never set to "true" in step 658, but always only set to "true" by one of the further processing steps in step 655, the usage of steps 657 and 658 as well as the sample value threshold here may no longer be needed.

As the advantageous alternatives mentioned previously, a group of the pixels may share one common ADC 23, or may share one common e/V converter 21 and one common ADC 23, therefore the shared e/V converter 21 and/or the shared ADC 23 may need to be time-multiplexed within one sampling interval. Similarly, the processing blocks 41 may also need to be time-multiplexed within one sampling interval.

Event Detection

Figure 7:
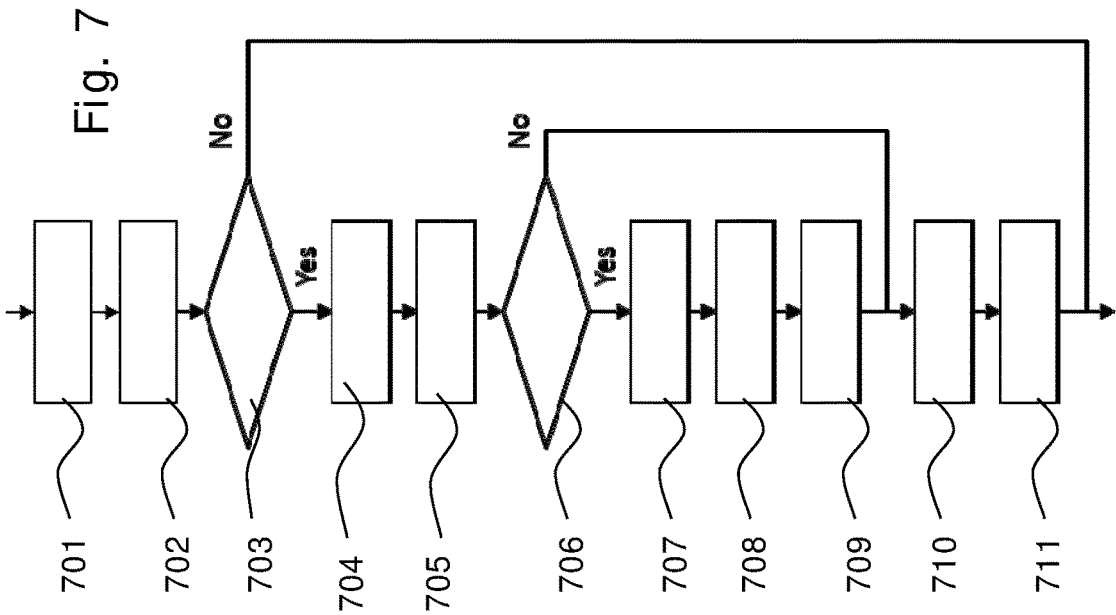
FIG. 7 shows a flow chart of processing steps performed by the readout processor for event detection according to a preferred embodiment.

If the processing option of the pixel is configured to event detection, then after updating both the current accumulated pixel value and the current sampling count, each processing block 41 may perform for the pixel the following further processing steps, as shown in the flow chart in FIG. 7, to decide whether or not to generate and output a pixel event from the corresponding pixel based on a temporal contrast:

1. Based on the current sampling count, select the accumulated pixel value threshold (701);
2. Compute a normalized current accumulated pixel value by multiplying the current accumulated pixel value by the normalization factor, which in this case consists of only the gain mismatch corrector (702);

3. Decide if the normalized current accumulated pixel value exceeds the accumulated pixel value threshold, or if the current sampling count reaches a maximum count threshold (703):

a. If yes:

i. Compute the temporal contrast (704);

ii. Based on the current sampling count and/or the previous sampling count, select a positive temporal contrast threshold and a negative temporal contrast threshold (705);

iii. Decide if the temporal contrast exceeds the positive temporal contrast threshold or falls below the negative temporal contrast threshold (706):

1. If yes:

a. Request to output the pixel event (707);

b. Update the previous sampling count with the current sampling count (708);

c. Update the previous accumulated pixel value with the current accumulated pixel value (709);

2. If no: no action iv. Reset the current sampling count to zero (710);

v. Reset the current accumulated pixel value to zero (711);

b. If no: no action

In the above processing steps, the accumulated pixel value threshold, the positive temporal contrast threshold and the negative temporal contrast threshold are selected from the lookup table in the threshold memory 7 to achieve the optimal tradeoff between the temporal contrast sensitivity and the temporal resolution based on the SNR(s) of the current accumulated pixel value and/or the previous accumulated pixel value.

An example of the lookup table is shown below, which contains seven tuples of the processing thresholds associated with each other, where in each tuple, the first processing threshold in digital number (DN) is the count threshold, the second processing threshold in DN is the accumulated pixel value threshold, and the third and the fourth processing thresholds (combined into one column) in percentage (%) are the positive temporal contrast threshold and the negative temporal contrast threshold:

| Count threshold [DN] | Accumulated pixel value threshold [DN] | Positive/negative temporal contrast threshold [%] |
| --- | --- | --- |
| 2 | 8200 | +/−1.6 |
| 8 | 2500 | +/−2.8 |
| 26 | 750 | +/−5.2 |
| 80 | 225 | +/−9.4 |
| 242 | 68 | +/−17.2 |
| 728 | 21 | +/−31.5 |
| 999 | 6 | +/−57.4 |

The processing block 41 may take the current sampling count as the input to this example lookup table, and select the accumulated pixel value threshold, the positive temporal contrast threshold and the negative temporal contrast threshold from the adjacent tuple where the count threshold is immediately above the current sampling count. It should be noted that here the condition of being immediately above includes being equal to.

This example lookup table suggests the following: If a pixel receives a high incident light intensity, such that the current accumulated pixel value exceeds 8200 DN within 2 sampling intervals, then the current accumulated pixel value has a sufficient SNR to support a positive or a negative temporal contrast threshold of +1-1.6% every 2 sampling intervals. Therefore, the pixel is processed with a high temporal contrast sensitivity and a high temporal resolution. If a pixel receives a lower incident light intensity, such that the current accumulated pixel value does not reach 8200 DN within 2 sampling intervals, then the current accumulated pixel value has an insufficient SNR to support a positive or a negative temporal contrast threshold of +/−1.6%. In this case, the current accumulated pixel value needs to keep accumulating in the next sampling intervals, till the current accumulated pixel value exceeds the accumulated pixel value threshold selected by the processing block 41 based on the current sampling count. Therefore, the pixel is processed with a lower temporal contrast sensitivity and a lower temporal resolution. The rationale behind the above example lookup table is the following: The SNR of the current accumulated pixel value increases with the current accumulated pixel value. Therefore, the accumulated pixel value threshold essentially corresponds to an SNR threshold. However, for the pixel to work across a wide dynamic range, such as from an ambient illumination of 0.1 lux to 100 k lux, or 120 dB, it would take the pixel $10^6$ sampling intervals under 0.1 lux to reach the same accumulated pixel value threshold that can be reached in one sampling interval under 100 k lux. If each sampling interval is 50 μs, then it would take the pixel 50 s under 0.1 lux to reach the same SNR that can be reached in 50 μs under 100 k lux. It is impractical to operate the pixel to always reach the same SNR across a 120 dB dynamic range by allowing the pixel to accumulate for from 50 μs to 50 s, which translates to a temporal resolution range of from 20 k Hz to 0.02 Hz. In practice, the pixel may only be allowed to accumulate for from 50 μs to 33 ms, which translates to a temporal resolution range of from 20 k Hz to 30 Hz. Hence, the above example lookup table guides the processing block 41 to gradually lower the accumulated pixel value threshold as the current sampling count increases, with the objective of finding the optimal tradeoff between the SNR and the temporal resolution. Similarly, the above example lookup table also guides the processing block 41 to gradually increase the absolute value of the positive and the negative temporal contrast thresholds correspondingly as the current sampling count increases to prevent generating the noise pixel event.

The lower the incident light intensity a pixel receives, the more sampling intervals the pixel accumulates, which effectively compensates for the degraded SNR of the current accumulated pixel value, not only by essentially prolonging the exposure time of the pixel in the digital domain, but also by reducing the temporal noise via oversampling and averaging.

The oversampling and averaging technique further improves the effective bit depth of the current or the previous accumulated pixel value beyond the nominal bit resolution of the ADC 23, which makes a more compact, lower power pixel design possible while achieving a given effective bit depth target. It shall be noted however, that the oversampling and averaging technique is only effective if the quantization noise of the ADC has a lower power than that of the white noise, such as the thermal noise of the ADC 23.

The temporal contrast is calculated as following:

$$\text{Temporal contrast} = \cfrac{\cfrac{\text{Current accumulated pixel value}}{\text{Current sampling count}}}{\cfrac{\text{Previous accumulated pixel value}}{\text{Previous sampling count}}} - 1$$

The above result reflects the actual temporal contrast in the incident light intensity received by the pixel. Also, because the above result is computed with a ratio between the current accumulated pixel value and the previous accumulated pixel value, the inter-pixel gain mismatch is eliminated from the above result.

Alternatively or cumulatively, after updating both the current accumulated pixel value and the current sampling count, each processing block 41 may further decide whether or not to generate and output a pixel event from the corresponding pixel based on a temporal difference. The further processing steps involving the temporal difference are almost identical to the previously described further processing steps involving the temporal contrast, except for two main differences:

First, instead of or in addition to the temporal contrast, the temporal difference may be used, which is computed as following, where the gain mismatch corrector is used directly in place of the normalization factor because the normalization factor consists of only the gain mismatch corrector:

$$\text{Temporal difference} =$$

$$\left( \frac{\text{Current accumulated pixel value}}{\text{Current sampling count}} - \frac{\text{Previous accumulated pixel value}}{\text{Previous sampling count}} \right).$$

$$\text{Gain mismatch corrector}$$

Second, instead of or in addition to the positive temporal contrast threshold and the negative temporal contrast threshold, a positive temporal difference threshold and a negative temporal difference threshold may be selected from the lookup table, which may be configured to contain various positive and negative temporal difference thresholds based on the same rationale as explained earlier in connection with the temporal contrast.

As yet another alternative or cumulative example, after updating both the current accumulated pixel value and the current sampling count, each processing block 41 may further decide whether or not to generate and output a pixel event from the corresponding pixel based on intensity thresholding, i.e. if an intensity value exceeds one or multiple intensity value threshold(s). The further processing steps involving the intensity thresholding are almost identical to the previously described further processing steps involving the temporal contrast and/or the temporal difference, except for two main differences:

First, instead of or in addition to the temporal contrast and/or the temporal difference, the intensity value may be used, which is computed as following, where the gain mismatch corrector is again used directly in place of the normalization factor because the normalization factor consists of only the gain mismatch corrector:

$$\text{Intensity value} =$$

$$\frac{\text{Current accumulated pixel value} \cdot \text{Gain mismatch corrector}}{\text{Current sampling count}}$$

Second, instead of or in addition to the positive and the negative temporal contrast thresholds and/or the positive and the negative temporal difference thresholds, one or multiple intensity value threshold(s) may be selected from the lookup table. The intensity value threshold(s) may be predetermined and constant, e.g. 500 DN and/or 1000 DN, which is/are independent of the current sampling count.

Other alternative or cumulative embodiments may foresee that, after updating both the current accumulated pixel value and the current sampling count, each processing block 41 may further decide whether or not to generate and output a pixel event from the corresponding pixel based on a spatial contrast and/or a spatial difference. The further processing steps involving the spatial contrast and/or the spatial difference are almost identical to the previously described further processing steps involving the temporal contrast and/or the temporal difference, except for two main differences: first, the spatial contrast and/or the spatial difference may be computed and used in place of or in addition to the temporal contrast and/or the temporal difference; second, instead of or in addition to the positive and the negative temporal contrast thresholds and/or the positive and the negative temporal difference thresholds, a positive and a negative spatial contrast thresholds and/or a positive and a negative spatial difference thresholds may be selected from the lookup table.

After all processing blocks 41 finish processing one row of the pixels, the processing block(s) that has/have requested to output the pixel event(s) then communicate(s) the corresponding pixel event(s) as the event sensor's event data output, advantageously via a high-speed token-based communication system such as described in EP3561685A1. Each pixel event may contain the pixel address obtained from the row and the column address encoders 53, 54, a timestamp, the temporal contrast, the temporal difference, the intensity value, the spatial contrast, and/or the spatial difference.

The read and write operations between the pixel array 10, the readout processor 4 and the parameter memory 3 are all in the digital domain and hence have short access time on the order of 10 ns. The processing blocks perform 41 mainly addition, subtraction, multiplication, and division operations, which can be implemented by combinational logic. Therefore, a pipelined row-by-row readout and processing of 1000 rows of the pixels only introduces an additional latency on the order of 10 μs.

Advantageously, there may be an additional output compressor to compress the event data output, namely the temporal contrast, the temporal difference, the intensity value, and spatial contrast and/or the spatial difference via a Gamma compression, a logarithmic compression, or another type of nonlinear compression which compresses a wider range of values into a smaller number of bits.

Frame Capture

Figure 8:
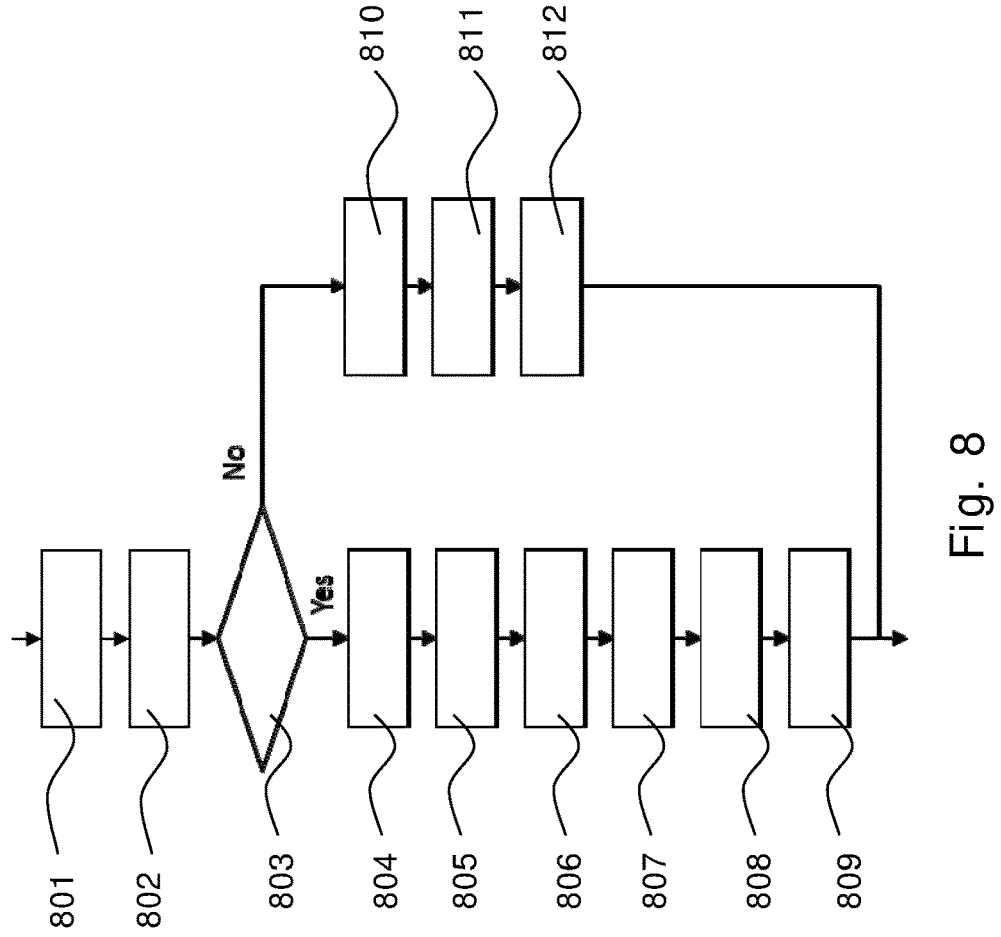
FIG. 8 shows a flow chart of processing steps performed by the readout processor for frame capture according to a preferred embodiment.

If the processing option of the pixel is configured to frame capture, then after updating both the current accumulated pixel value and the current sampling count, each processing block 41 may perform for the pixel the following further processing steps, as shown in the flow chart in FIG. 8, to compute and output the intensity value from the corresponding pixel:

1. Based on the current sampling count, select the accumulated pixel value threshold (801);
2. Compute the normalized current accumulated pixel value by multiplying the current accumulated pixel value by the normalization factor, which in this case consists of only the gain mismatch corrector (802);
3. Decide if the normalized current accumulated pixel value exceeds the accumulated pixel value threshold, or if the current sampling count reaches the maximum count threshold (803):

a. If yes:

i. Compute the intensity value by dividing the normalized current accumulated pixel value by the current sampling count (804);

ii. Output the intensity value (805);

iii. Update the previous sampling count with the current sampling count (806);

iv. Update the previous accumulated pixel value with the current accumulated pixel value (807);

v. Reset the current sampling count to zero (808);

vi. Reset the current accumulated pixel value to zero (809);

b. If no:

i. Compute a normalized previous accumulated pixel value by multiplying the previous accumulated pixel value by the normalization factor, which in this case consists of only the gain mismatch corrector (810);

ii. Compute the intensity value by dividing the normalized previous accumulated pixel value by the previous sampling count (811);

iii. Output the intensity value (812);

The above further processing steps aim to output the intensity values with sufficient SNRs from all pixels, but do not guarantee the intensity values reflect the incident light intensities received by all pixels within the same time period.

Figure 9:
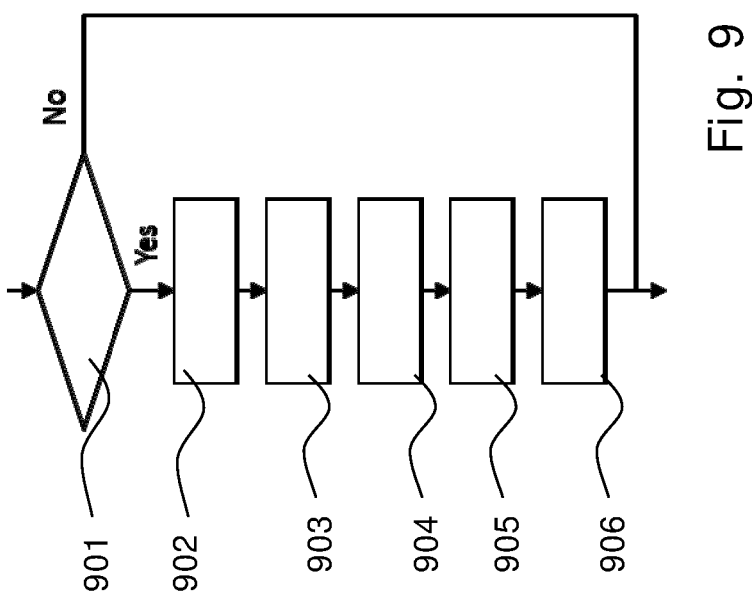
FIG. 9 shows a flow chart of processing steps performed by the readout processor for frame capture according to an alternative embodiment.

Advantageously, after updating both the current accumulated pixel value and the current sampling count, each processing block 41 may perform for the pixel the following alternative further processing steps, as shown in the flow chart in FIG. 9, to compute and output the intensity value from the corresponding pixel:

1. Decide if the current sampling count exceeds a predetermined count threshold (901):

a. If yes:

i. Compute the normalized current accumulated pixel value by multiplying the current accumulated pixel value by the normalization factor, which in this case consists of only the gain mismatch corrector (902);

ii. Compute the intensity value by dividing the normalized current accumulated pixel value by the current sampling count (903);

iii. Output the intensity value (904);

iv. Reset the current sampling count to zero (905);

v. Reset the current accumulated pixel value to zero (906);

b. If no: no action

When performed after a global reset of both the current sampling counts and the current accumulated pixel values for all pixels, the above alternative further processing steps guarantee that the intensity values reflect the incident light intensities received by all pixels within the same time period.

Both of the above two variants of further processing steps utilize oversampling and averaging to improve the SNR and hence the effective bit depth of the intensity value.

After all processing blocks 41 finish processing one row of the pixels, their intensity values, reflecting the incident light intensities received by the corresponding pixels, are communicated as the event sensor's frame data output. Advantageously, the high-speed token-based communication system used for the event data output may also serve the frame data output, where the processing blocks 41 communicate their intensity values in sequence, and the pixel address may be discarded. Alternatively, the frame data output may employ a standard shift-register-based communication system.

Advantageously, the output compressor described for the event data output may also compress frame data output, namely the intensity values via a Gamma compression, a logarithmic compression, or another type of nonlinear compression, which compresses a wider range of the intensity values into a smaller number of bits.

Standby

Figure 10:
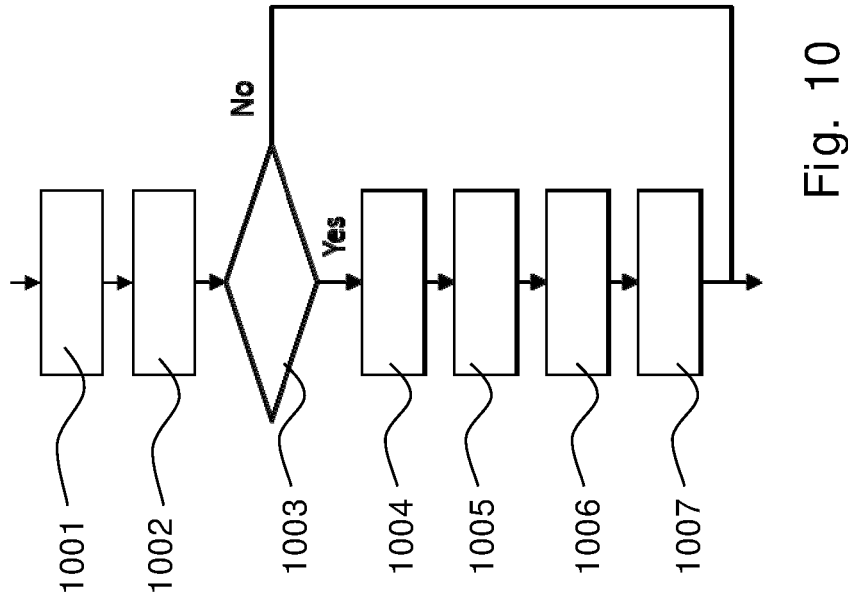
FIG. 10 shows a flow chart of processing steps performed by the readout processor for standby according to a preferred embodiment.

If the processing option of the pixel is configured to standby, then after updating both the current accumulated pixel value and the current sampling count, each processing block 41 may perform for the pixel the following further processing steps, as shown in the flow chart in FIG. 10, to only keep the pixel parameters updated:

1. Based on the current sampling count, select an accumulated pixel value threshold (1001);

2. Compute the normalized current accumulated pixel value by multiplying the current accumulated pixel value by the normalization factor, which in this case consists of only the gain mismatch corrector (1002);

3. Decide if the normalized current accumulated pixel value exceeds the accumulated pixel value threshold, or if the current sampling count exceeds the maximum count threshold (1003):

a. If yes:

i. Update the previous sampling count with the current sampling count (1004);

ii. Update the previous accumulated pixel value with the current accumulated pixel value (1005);

iii. Reset the current sampling count to zero (1006);

iv. Reset the current accumulated pixel value to zero (1007);

b. If no: no action

The above processing steps may be performed by the processing blocks to initialize the pixel parameters and to prevent overflowing the parameter memory 3.

Hybrid Processing Options

Besides the aforementioned processing options of event detection, frame capture, and standby, there may be other alternative processing options derived from combining parts of selected processing steps from the aforementioned processing options.

Calibration

Figure 11:
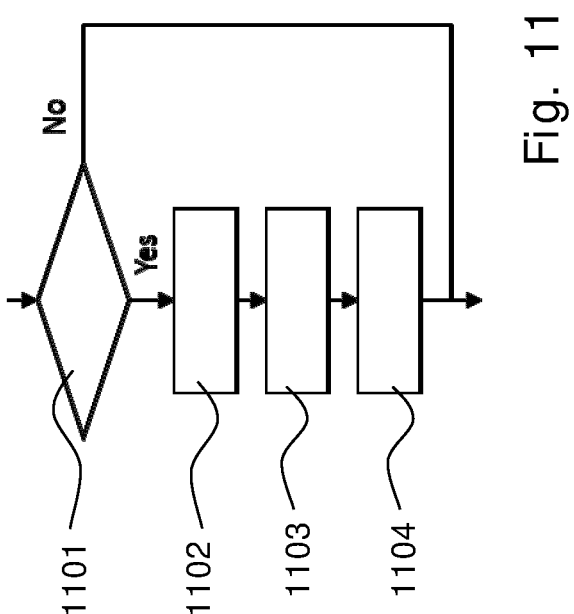
FIG. 11 shows a flow chart of processing steps performed by the readout processor for calibration according to a preferred embodiment.

If the processing option of the pixel is configured to calibration, then after updating both the current accumulated pixel value and the current sampling count, each processing block 41 may perform for the pixel the following further processing steps, as shown in the flow chart in FIG. 11, to output the current accumulated pixel value from the corresponding pixel directly:

1. Decide if the current sampling count exceeds a predetermined count threshold (1101):

a. If yes:

i. Output the current accumulated pixel value (1102);

ii. Reset the current sampling count to zero (1103);

iii. Reset the current accumulated pixel value to zero (1104);

b. If no: no action

During the calibration procedure, the above processing steps are typically performed after a global reset of the current accumulated pixel values and the current sampling counts for all pixels.

To obtain the pixel-specific gain mismatch correctors, all pixels are exposed to a uniform light source, at a low illumination level, and at a high illumination level. The event sensor outputs a first frame of the current accumulated pixel values reflecting a low incident light intensity received by the pixels, called pixel low values. The event sensor also outputs a second frame of the current accumulated pixel values reflecting a high incident light intensity received by the pixels, called pixel high values. Because the pixel high values and the pixel low values are derived from the current accumulated pixel values, given a sufficiently high count threshold, the pixel high values and the pixel low values contain sufficiently high SNRs. The pixel low values may in particular be computed using a higher count threshold than the pixel high values.

A pixel value difference is computed for each pixel as:

Pixel value difference(of the pixel)=Pixel high value
(of the pixel)−Pixel low value(of the pixel)

Then, an array average pixel value difference is computed as:

Array average pixel value difference =

$$\frac{\sum \text{Pixel value differences (of all pixels in the array)}}{\text{Total number of the pixels in the array}}$$

Hence, the gain mismatch corrector for each pixel is computed as:

Gain mismatch corrector (of the pixel) =

$$\frac{\text{Array average pixel value difference}}{\text{Pixel value difference (of the pixel)}}$$

To further reduce the temporal noise, the above procedure may be repeated multiple times to derive a temporal average result.

To determine the positive and/or the negative temporal contrast threshold(s) associated with a given count threshold, all pixels are exposed to a uniform light source with a certain illumination level such that, the outputted current accumulated pixel values based on the given count threshold approximately equal the accumulated pixel value threshold associated with the given count threshold. Then, the event sensor outputs a sufficient number of frames of the current accumulated pixel values, such as 10, 100 or more frames. The SNR of the outputted current accumulated pixel values can be calculated via the photon transfer curve method, which is a standard image sensor characterization method. Assuming the temporal noise in the outputted current accumulated pixel values is a Gaussian noise, then the positive and/or the negative temporal contrast threshold(s) may be determined based on a normal distribution. If for example the SNR of the outputted current accumulated pixel values is 100, then the positive or the negative temporal contrast threshold associated with the given count threshold may be set to +/−1.4%, +/−2.8% or +/−4.2% to prevent generating the noise pixel events with a 68%, 95%, or 99.7% probability, respectively.

As mentioned by the previous advantageous alternative embodiments, the positive and/or the negative temporal difference threshold(s), the positive and/or the negative spatial contrast threshold(s), and/or the positive and/or the negative spatial difference threshold(s) associated with a given count threshold can be determined using the same procedure and method described above for determining the positive and/or the negative temporal contrast threshold(s).

Figure 12:
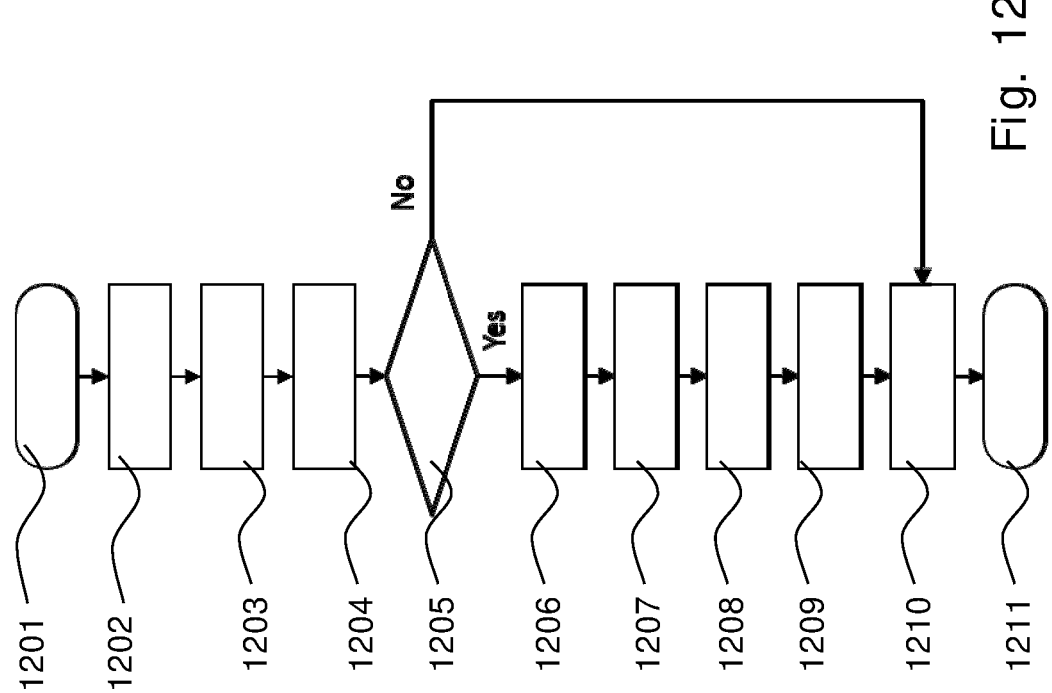
FIG. 12 shows a flow chart of processing steps performed by the readout processor for calibration according to an alternative embodiment.

Lastly, to obtain the offset compensator for each pixel, each processing block 41 may perform for the pixel the following modified processing steps, as shown in the flow chart in FIG. 12, to skip the processing steps described for CDS and to output the offset compensator computed from oversampling and averaging the sample baselines:

1. Receive the sample baseline, the current accumulated pixel value, the current sampling count and the processing option parameter of the same pixel (1201);
2. Convert the sample baseline from Gray code into binary format (1202);
3. Update the current accumulated pixel value by adding the sample baseline to the current accumulated pixel value (1203);
4. Update the current sampling count by incrementing the current sampling count by one (1204);
5. Decide if the current sampling count exceeds a predetermined count threshold (1205):
    a. If yes:
        i. Compute the offset compensator by dividing the current accumulated pixel value by the current sampling count (1206);
        ii. Output the offset compensator (1207);
        iii. Reset the current sampling count to zero (1208);
        iv. Reset the current accumulated pixel value to zero (1209);
    b. If no: no action
6. Write the current accumulated pixel value, the current sampling count, and possibly the offset compensator back into the corresponding memory block (1210); and
7. End of processing (1211).

During the calibration procedure, the above processing steps are typically performed after a global reset of the current accumulated pixel values and the current sampling counts for all pixels.

Given a sufficiently high count threshold, the outputted offset compensator for each pixel contains sufficiently high SNR via oversampling and averaging. To further reduce the temporal noise, the above procedure may be repeated multiple times to derive a temporal average result.

Pixel Array Processing Option Configuration

Because the processing option of each pixel is dynamically programmable, there are many ways to configure the processing options of the pixel array 10. As an advantageous example, the processing options of a subset of the pixels may be configured to event detection, while the processing options of another subset of the pixels may be configured to frame capture. As another advantageous example, the processing options of a subset of the pixels may be configured to event detection at one sampling interval, while the processing options of the same subset of the pixels may be configured to frame capture at a different sampling interval. Other configurations may be derived using different combinations of the processing options, subsets of the pixels and/or the sampling intervals.

REFERENCE NUMERALS 10 pixel array
1 photodetector, photoelectric converter, photodiode, pinned photodiode, PPD
2 signal converter
21 analog converter, charge-to-voltage converter, electron-to-voltage converter, e/V converter, active pixel circuit
22 converter memory, floating diffusion
23 analog-to-digital converter, ADC

24 comparator
25 sample memory
3 parameter memory, with
31 memory blocks
4 readout processor, with
41 processing blocks
51 bias generator
52 ADC controller
53 row address encoder
54 column address encoder
55 readout controller
56 memory configurator
61 external computer
62 external non-volatile storage
7 threshold memory

The invention claimed is:

1. An event sensor comprising a pixel array of pixels and configured to produce a signal stream of event data in reaction to light incident on said pixel array, comprising:

for each pixel of said pixel array at least one photodetector configured to produce a detector signal in reaction to light incident on said pixel;

for each pixel or a group of said pixels a signal converter connected to said photodetector and configured to repeatedly produce and store digital sample values dependent on said detector signal sampled at sampling intervals; and a readout processor connected to said signal converter and configured:

to derive a digital accumulated pixel value based on one or multiple of said sample values, wherein said accumulated pixel value corresponds to an accumulation of said detector signal over a sampling count of said sampling intervals, and to generate a pixel event of said event data dependent on said accumulated pixel value and said sampling count, and to calculate a division result of dividing said accumulated pixel value by said sampling count, and to generate said pixel event dependent on said division result.

2. The event sensor according to claim 1, further comprising a parameter memory configured to store said sampling count, wherein said readout processor is configured:

to read said sample values and/or said sampling count;

to update said sampling count by incrementing said sampling count for each sampling interval of said accumulation;

to write said sampling count; and to derive said accumulated pixel value based on an average of one or multiple of said sample values within the last sampling interval of said accumulation.

3. The event sensor according to claim 1, further comprising a parameter memory configured to store said accumulated pixel value and said sampling count, wherein said readout processor is configured:

to read said sample values, said accumulated pixel value and/or said sampling count;

to update said accumulated pixel value by adding an average of one or multiple of said sample values within one sampling interval of said accumulation to said accumulated pixel value;

to update said sampling count by incrementing said sampling count for each sampling interval of said accumulation; and to write said accumulated pixel value and/or said sampling count.

4. The event sensor according to claim 1, further comprising a parameter memory configured to store a previous accumulated pixel value, a previous sampling count, and/or a previous division result of dividing said previous accumulated pixel value by said previous sampling count, wherein said readout processor is configured:

to read said previous accumulated pixel value, said previous sampling count, and/or said previous division result;

to generate said pixel event based on said division result and said previous division result; and to overwrite said previous accumulated pixel value, said previous sampling count, and/or said previous division result with said accumulated pixel value, said sampling count, and/or said division result respectively.

5. The event sensor according to claim 4, wherein said division result and/or said previous division result (each) contain(s) a higher number of bits than said sample values.

6. The event sensor according to claim 4, wherein said readout processor is configured:

to determine an accumulated pixel value threshold based on said sampling count and/or said previous sampling count, and/or to determine a count threshold based on said accumulated pixel value and/or said previous accumulated pixel value;

to compare said accumulated pixel value and/or said previous accumulated pixel value to said accumulated pixel value threshold, and/or to compare said sampling count and/or said previous sampling count to said count threshold; and to generate said pixel event on the condition that said accumulated pixel value and/or said previous accumulated pixel value exceed(s) said accumulated pixel value threshold, and/or that said sampling count and/or said previous sampling count exceed(s) said count threshold.

7. The event sensor according to claim 6, wherein said readout processor is configured to determine based on said sampling count, said previous sampling count, said accumulated pixel value, and/or said previous accumulated pixel value:

at least one temporal contrast threshold;
at least one spatial contrast threshold;
at least one temporal difference threshold;
at least one spatial difference threshold; and/or
at least one intensity value threshold.

8. The event sensor according to claim 7, wherein said readout processor is configured to calculate:

a temporal contrast based on a quotient of said division result and said previous division result;

at least one spatial contrast based on a second quotient of said division result and a neighboring division result that corresponds to a neighboring pixel;

a temporal difference based on a difference between said division result and said previous division result;

at least one spatial difference based on a second difference between said division result and said neighboring division result; and/or an intensity value based on said division result and/or said previous division result, and wherein the readout processor is configured to generate said pixel event of said event data based on (a) comparison result(s) between said temporal contrast and said temporal contrast threshold(s), between said spatial contrast(s) and said spatial contrast threshold(s), between said temporal difference and said temporal difference threshold(s), between said spatial difference(s) and said spatial difference threshold(s), and/or between said intensity value and said intensity value threshold(s).

9. The event sensor according to claim 6, further comprising a threshold memory configured to store a lookup table, which contains one or multiple tuple(s) of two or more processing thresholds associated with each other, wherein said processing thresholds in each tuple are: said count threshold, said accumulated pixel value threshold, said temporal contrast threshold(s), said spatial contrast threshold(s), said temporal difference threshold(s), said spatial difference threshold(s), and/or said intensity value threshold(s), and wherein said readout processor is configured to select said count threshold, said accumulated pixel value threshold, said temporal contrast threshold(s), said spatial contrast threshold(s), said temporal difference threshold(s), said spatial difference threshold(s), and/or said intensity value threshold(s) by comparing said sampling count, said previous sampling count, said accumulated pixel value and/or said previous accumulated pixel value with respective processing threshold(s) in said tuple(s) to find an adjacent tuple, and by selecting said count threshold, said accumulated pixel value threshold, said temporal contrast threshold(s), said spatial contrast threshold(s), said temporal difference threshold(s), said spatial difference threshold(s), and/or said intensity value threshold(s) from said adjacent tuple.

10. The event sensor according to claim 6, further comprising a threshold memory configured to store a lookup table, which contains two or more tuples of two or more processing thresholds associated with each other, wherein said processing thresholds in each tuple are: said count threshold, said accumulated pixel value threshold, said temporal contrast threshold(s), said spatial contrast threshold(s), said temporal difference threshold(s), said spatial difference threshold(s), and/or said intensity value threshold(s), and wherein said readout processor is configured to determine said count threshold, said accumulated pixel value threshold, said temporal contrast threshold(s), said spatial contrast threshold(s), said temporal difference threshold(s), said spatial difference threshold(s), and/or said intensity value threshold(s) by comparing said sampling count, said previous sampling count, said accumulated pixel value and/or said previous accumulated pixel value with respective processing threshold(s) in said tuples to find two or more adjacent and/or close tuples, and by interpolating and/or extrapolating said count threshold, said accumulated pixel value threshold, said temporal contrast threshold(s), said spatial contrast threshold(s), said temporal difference threshold(s), said spatial difference threshold(s) and/or said intensity value threshold(s) based on said adjacent and/or close tuples.

11. The event sensor according to claim 10, wherein in any pair of said tuples: the tuple with the lower count threshold contains the higher accumulated pixel value threshold, the smaller absolute value(s) of said temporal contrast threshold(s), the smaller absolute value(s) of said spatial contrast threshold(s), the larger absolute value(s) of said temporal difference threshold(s), and/or the larger absolute value(s) of said spatial difference threshold(s); and the tuple with the higher count threshold contains the lower accumulated pixel value threshold, the larger absolute value(s) of said temporal contrast threshold(s), the larger absolute value(s) of said spatial contrast threshold(s), the smaller absolute value(s) of said temporal difference threshold(s), and/or the smaller absolute value(s) of said spatial difference threshold(s).

12. The event sensor according to claim 6, further comprising a threshold memory configured to store one or multiple parameter(s) for one or multiple threshold function(s) that map(s) one or multiple input(s) to one or multiple output(s), wherein said input(s) is/are: said sampling count, said previous sampling count, said accumulated pixel value or/and said previous accumulated pixel value, and said output(s) is/are: said count threshold, said accumulated pixel value threshold, said temporal contrast threshold(s), said spatial contrast threshold(s), said temporal difference threshold(s), said spatial difference threshold(s), or/and said intensity value threshold(s), and wherein said readout processor is configured to derive said count threshold, said accumulated pixel value threshold, said temporal contrast threshold(s), said spatial contrast threshold(s), said temporal difference threshold(s), said spatial difference threshold(s), and/or said intensity value threshold(s) from said sampling count, said previous sampling count, said accumulated pixel value and/or said previous accumulated pixel value using said threshold function(s).

13. The event sensor according to claim 12, wherein:

said temporal contrast threshold(s) include(s) a positive temporal contrast threshold, a negative temporal contrast threshold, and/or an absolute temporal contrast threshold; said spatial contrast threshold(s) include(s) a positive spatial contrast threshold, a negative spatial contrast threshold, and/or an absolute spatial contrast threshold; said temporal difference threshold(s) include(s) a positive temporal difference threshold, a negative temporal difference threshold, and/or an absolute temporal difference threshold; and/or said spatial difference threshold(s) include(s) a positive spatial difference threshold, a negative spatial difference threshold, and/or an absolute spatial difference threshold, and wherein:

said threshold function(s) that map(s) said sampling count and/or said previous sampling count to said accumulated pixel value threshold is/are monotonically decreasing;

said threshold function(s) that map(s) said accumulated pixel value and/or said previous accumulated pixel value to said count threshold is/are monotonically decreasing;

said threshold function(s) that map(s) said sampling count and/or said previous sampling count to said positive temporal contrast threshold, said absolute temporal contrast threshold, said positive spatial contrast threshold, said absolute spatial contrast threshold, said negative temporal difference threshold, and/or said negative spatial difference threshold is/are monotonically increasing;

said threshold function(s) that map(s) said sampling count and/or said previous sampling count to said negative temporal contrast threshold, said negative spatial contrast threshold, said positive temporal difference threshold, said absolute temporal difference threshold, said positive spatial difference threshold, and/or said absolute spatial difference threshold is/are monotonically decreasing;

said threshold function(s) that map(s) said accumulated pixel value and/or said previous accumulated pixel value to said positive temporal contrast threshold, said absolute temporal contrast threshold, said positive spatial contrast threshold, said absolute spatial contrast threshold, said negative temporal difference threshold, and/or said negative spatial difference threshold is/are monotonically decreasing; and/or said threshold function(s) that map(s) said accumulated pixel value and/or said previous accumulated pixel value to said negative temporal contrast threshold, said negative spatial contrast threshold, said positive temporal difference threshold, said absolute temporal difference threshold, said positive spatial difference threshold, and/or said absolute spatial difference threshold is/are monotonically increasing.

14. The event sensor according to claim 1, wherein said parameter memory is configured to further store a processing option parameter for the corresponding pixel, wherein said readout processor is configured to generate said pixel event according to said processing option parameter.

15. The event sensor according to claim 4, wherein said readout processor is configured to:
  compensate for a baseline or an offset in said sample values by subtracting a sample baseline or an offset compensator from said accumulated pixel value and/or said previous accumulated pixel value, wherein said sample baseline is produced by said signal converter, or said offset compensator is stored in said parameter memory, and/or
  normalize said sample values, said average of one or multiple of said sample values, said accumulated pixel value, and/or said previous accumulated pixel value by multiplying said sample values, said average of one or multiple of said sample values, said accumulated pixel value and/or said previous accumulated pixel value by a normalization factor, wherein said normalization factor is derived by said readout processor based on a gain mismatch corrector, and wherein said gain mismatch corrector is stored in said parameter memory.

16. The event sensor according to claim 15, wherein said signal converter further comprises a gain memory configured to store a gain code, wherein said gain code determines a programmable gain of said signal converter, and wherein said normalization factor is derived by said readout processor based on said gain mismatch corrector and/or said gain code.

17. A method for producing a signal stream of event data in reaction to light incident on a pixel array of pixels, comprising the following steps performed for each pixel or a group of said pixels:
  producing a detector signal in reaction to light incident on said pixel;
  repeatedly producing and storing digital sample values dependent on said detector signal sampled at sampling intervals;
  deriving a digital accumulated pixel value based on one or multiple of said sample values, wherein said accumulated pixel value corresponds to an accumulation of said detector signal over a sampling count of said sampling intervals; and
  generating a pixel event of said event data dependent on said accumulated pixel value and said sampling count; and
  calculating a division result of dividing said accumulated pixel value by said sampling count, and generating said pixel event dependent on said division result.

* * * * *